(12) United States Patent
Gaubatz

(10) Patent No.: US 10,951,321 B2
(45) Date of Patent: Mar. 16, 2021

(54) PHASE MODULATION DEVICE, RECEIVER, TRANSMITTER AND A PHASE MODULATING METHOD

(71) Applicant: Xieon Networks S.a.r.l., Luxembourg (LU)

(72) Inventor: Ulrich Gaubatz, Munich (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/092,158

(22) PCT Filed: May 2, 2017

(86) PCT No.: PCT/EP2017/060392
§ 371 (c)(1),
(2) Date: Oct. 8, 2018

(87) PCT Pub. No.: WO2017/191122
PCT Pub. Date: Nov. 9, 2017

(65) Prior Publication Data
US 2019/0123831 A1   Apr. 25, 2019

(30) Foreign Application Priority Data

May 4, 2016 (EP) ..................................... 16168270

(51) Int. Cl.
*H04B 10/548* (2013.01)
*H04B 10/50* (2013.01)
(Continued)

(52) U.S. Cl.
CPC ......... *H04B 10/548* (2013.01); *G02B 6/2726* (2013.01); *G02B 6/2766* (2013.01);
(Continued)

(58) Field of Classification Search
None
See application file for complete search history.

(56) References Cited

U.S. PATENT DOCUMENTS

2011/0158579 A1   6/2011   Little

OTHER PUBLICATIONS

Bononi, A. et al., "Is there life beyond the Principal States of polarization?," Optical Fiber Technology, vol. 8 (4):257-294 (2002).
(Continued)

*Primary Examiner* — Darren E Wolf

(57) ABSTRACT

A phase modulation device is provided that comprises a retardation device and a control device. The retardation device is characterized by first and second polarization eigenstates $SOP_f$ and $SOP_s$. Light polarized according to the second polarization eigenstate $SOP_s$ acquires, upon passing through said retardation device, a delay with regard to light polarized according to the first polarization eigenstate $SOP_f$, which delay corresponds to $\lambda/2 \pm 30\%$, preferably $\lambda/2 \pm 20\%$ and most preferably $\lambda/2 \pm 10\%$. The retardation device is arranged to receive input light having a polarization state $SOP_i$ that defines an angle with respect to one of the first and second polarization eigenstates $SOP_f$, $SOP_s$ within a predetermined angle range and to emit output light. The control device is configured to control at least one of a change of the angle between the polarization state $SOP_i$; of the input light and the respective polarization eigenstate $SOP_f$, $SOP_s$ by less than $0.1*\pi$, preferably less than $0.05*\pi$ and most preferably less than $0.02*\pi$; and a change of the amount of said delay upon passing through said retardation device by less than $0.3*\lambda$, preferably less than $0.2*\lambda$ and most preferably less than $0.1*\lambda$, such that a phase shift of $\pi \pm 30\%$, preferably $\pi \pm 20\%$ and most preferably $\pi \pm 10\%$ on the output light is obtained.

20 Claims, 27 Drawing Sheets

(51) Int. Cl.
   *G02F 1/01*   (2006.01)
   *G02B 6/27*   (2006.01)
   *G02B 6/28*   (2006.01)
   *H04B 10/60*  (2013.01)
   *H04B 10/40*  (2013.01)

(52) U.S. Cl.
   CPC ......... *G02B 6/2861* (2013.01); *H04B 10/505* (2013.01); *H04B 10/40* (2013.01); *H04B 10/50* (2013.01); *H04B 10/60* (2013.01)

(56) References Cited

OTHER PUBLICATIONS

Davis, J. et al., "Polarization eigenstates for twisted-nematic liquid-crystal displays," Applied Optics, vol. 37(5): 937-945 (1998).
Gutiérrez-Vega, J. et al., "Pancharatnam-Berry phase of optical systems," Optics Letters, vol. 36(7): 1143-1145 (2011).
International Search Report and Written Opinion, PCT/EP2017/060392, dated Jul. 10, 2017, 16 pages.
Van Dijk, T. et al., "The Pancharatnam-Berry phase for non-cyclic polarization changes," Optics Express, vol. 18(10): 10796-10804 (2010).

PHASE MODULATION DEVICE, RECEIVER, TRANSMITTER AND A PHASE MODULATING METHOD

RELATED APPLICATIONS

This application is a 35 U.S.C. 371 national stage filing of International Application No. PCT/EP2017/060392, filed on May 2, 2017, which claims priority to European Patent Application No. 16168270.3, filed on May 4, 2016. The entire contents of these applications are incorporated herein by reference in their entirety.

FIELD OF THE INVENTION

The present invention is in the field of optical data transmission. More specifically, the invention relates to a phase modulation device, a receiver, a transmitter and a phase modulating method.

BACKGROUND OF THE INVENTION

Phase modulation refers to a modulation technique that encodes a modulation signal as variations in the instantaneous phase of a carrier wave while the amplitude and the frequency of the carrier wave may remain unaltered.

A widely used type of phase modulator is an electro-optic modulator which exploits the electrooptic effect, i.e. altering the refractive index of a medium in response to an electric field. A light beam passing through the electro-optic medium can be manipulated as a function of the applied electric field, thereby imposing a modulation on the phase, frequency, amplitude and/or polarization of the light beam.

Further types of phase modulators include liquid crystal modulators, thermal induction of refractive index changes or length changes e.g. of an optical fiber, and length changes by stretching. Phase modulators are often implemented in integrated optics, where light is modulated in waveguides.

The electro-optic effect is caused by forces that distort the position, orientation and/or shape of the particles constituting the medium. For example, the refractive index of a lithium niobate crystal changes as a function of the applied electric field, thereby slowing down light travelling through the crystal. The phase of the light exiting the crystal is proportional to the time required for the light to pass through it. The total phase shift may comprise a dynamic and a geometric component.

The voltage required for inducing a phase change of $\pi$ is usually called a half-wave voltage. In usual electro-optical phase modulators, the half-wave voltage is several to several tens of volts. Suitable electronic circuits are required for switching the voltage within a small time period, e.g. of few nanoseconds.

SUMMARY OF THE INVENTION

Against this background, a problem underlying the invention is to provide a device and a method for a fast and/or energy efficient phase modulation.

This problem is solved by a phase modulation device, a receiver, a transmitter as well as a method according to claims 1, 12, 15 and 16, respectively. Preferable embodiments are defined in the dependent claims.

According to a first aspect of the invention, a phase modulation device is provided that comprises a retardation device and a control device. The retardation device is characterized by first and second polarization eigenstates SOPf and SOPs. Light polarized according to the second polarization eigenstate SOPs acquires, upon passing through said retardation device, a delay with regard to light polarized according to the first polarization eigenstate SOPf, which delay corresponds to $\lambda/2\pm30\%$, preferably $\lambda/2\pm20\%$ and most preferably $\lambda/2\pm10\%$. The retardation device is arranged to receive input light having a polarization state SOPi that defines an angle with respect to one of the first and second polarization eigenstates SOPf, SOPs within a predetermined angle range and to emit output light. The control device is configured to control at least one of:

- a change of the angle between the polarization state SOPi of the input light and the respective polarization eigenstate SOPf, SOPs by less than $0.1*\pi$, preferably less than $0.05*\pi$ and most preferably less than $0.02*\pi$; and
- a change of the amount of said delay upon passing through said retardation device by less than $0.3*\lambda$, preferably less than $0.2*\lambda$ and most preferably less than $0.1*\lambda$, such that a phase shift of $\pi\pm30\%$, preferably a $\pi\pm20\%$ and most preferably $\pi\pm10\%$ on the output light is obtained.

The indication of parameter ranges using "±" refers to all values within the indicated range instead of the boundary values only. For example, the phase shift of $\pi\pm30\%$ refers to all phase shift values from $\pi-30\%$ to $\pi+30\%$.

Accordingly, a phase modulation device is provided that is able to transform a comparatively small change of polarization state of the input light and/or a comparatively small amount of the delay caused by the retardation device into a large phase shift of $\pi$ or at least close to $\pi$ imposed on the output light. Accordingly, large phase modulations can be obtained rapidly and with reduced expense of energy.

As will be explained below, depending on the choice of the angle between the polarization state SOPi of the input light and the respective polarization eigenstate SOPf, SOPs, and further depending on the amount of said delay, in theory, infinitesimally small changes in said angle and/or said delay can lead to changes in the phase of the output light in the amount of $\pi$. This will be explained in detail in the following sections. However, in practical applications, a similar effect can be employed with slightly different choices of said angle and said delay, which will make somewhat larger changes in the angle and/or the delay necessary, and which may lead to phase changes that deviate from $\pi$ by up to $\pm10\%$, up to $\pm20\%$ or even up to $\pm30\%$. Nevertheless, even with this "non-optimum" choices of said angle and said delay, a high "leverage", i.e. a high phase change as a result of a small change in angle and/or delay can be achieved. Next, the principles underlying the phase modulation scheme of the invention shall be explained in detail.

As used herein, the term "light" refers to electromagnetic waves in general and is not limited to visible light. Light travels in a propagation direction and carries oscillating electromagnetic fields. For example, the oscillation takes place in a plane perpendicular to the propagation direction. In addition, the oscillating electromagnetic fields may have a longitudinal component with respect to the propagation direction. The polarization state of light indicates that the tip of the electromagnetic field follows a certain shape when projected onto a plane perpendicular to the propagation direction. Generally, the shape of this light projection is an ellipse.

The specific shape and orientation of the ellipse is a called a state of polarization (SOP). The SOP can vary or can be changed, e.g. by birefringent elements. For example, the generally elliptical shape of the SOP can degenerate to a line, resulting in a linear SOP, or to a circle, resulting in a circular SOP. The direction in which the tip of the electromagnetic field of a circular SOP moves could be right or left handed with respect to the propagation direction.

The SOP of an electromagnetic field can be described by two orthogonal polarization components that are defined by two orthogonal laboratory directions x and y, while the propagation direction of the light defines a third laboratory direction z. The directions x, y and z are perpendicular to each other. Each component x and y can be described by three real valued numbers $\theta$, $\varepsilon$ and $\phi$ as a two dimensional Jones vector $$e^{i\phi}\begin{bmatrix} \cos(\theta)\cos(\varepsilon) - i\sin(\theta)\sin(\varepsilon) \\ \sin(\theta)\cos(\varepsilon) + i\cos(\theta)\sin(\varepsilon) \end{bmatrix}.$$

The angle $\theta$ represents an azimuth angle of the SOP and describes the orientation of the long semi-axis of the ellipse relative to the laboratory coordinate system. The angle $\varepsilon$ is called ellipticity and defined based on the ratio of the short semi-axis to the long semi-axis of the ellipse. The sign of ellipticity E indicates the helicity of the electromagnetic field. Accordingly, a SOP can generally be decribed by $\theta$ and $\varepsilon$. The phase $\phi$ describes the delay of both x and y components relative to time. The parameters $\theta$, $\varepsilon$ and $\phi$ can be calculated from the x- and y components of the electromagnetic field.

The input light passing through the retardation device can be provided by an electromagnetic carrier signal. Usually, the carrier signal is provided as a sinusoidal function of time at a predetermined frequency and amplitude. The phase modulation device basically refers to a device or apparatus configured to encode information inside a carrier signal by imposing phase shifts representing said information. The information is provided as a modulation signal which can generally be any type of function. In binary communication systems, the modulation signal is often provided as a rectangular or gate function. For example, the value "1" corresponds to a change between two amplitude levels of a rectangular modulation function and is imposed as a phase shift of a on the carrier signal. In another example, the value "1" is encoded as a certain number of consecutive phase shifts of a imposed on the carrier signal. Several consecutive wave periods can be merged together to an information unit. For example, a sequence of eight consecutive wave periods forms a byte.

The phase modulation device may be configured to receive or to generate such a carrier signal. In particular, the phase modulation device can be provided with a light source for generating the carrier signal. The phase modulation device is configured to impose the phase shift of $\pi$ or at least approximately rr on the carrier signal as function of the modulation signal to be transmitted.

In an example, the retardation device comprises a birefringent medium, e.g. a crystalline glass plate, a section of optic fiber, or a Lithium Niobate ($LiNbO_3$) crystal having two optic axes corresponding to the first and second polarization eigenstates SOPf and SOPs. The term "axis" generally refers to the respective polarization eigenstate which can be elliptical, circular or linear. The light components, which are polarized according to the polarization eigenstates SOPf, SOPs, of light propagating in the birefringent medium experience a first and second refractive index, respectively. The polarization state of light exiting the medium has not changed, if the polarization state is collinear with one of the polarization eigenstates SOPf, SOPs of the retardation device.

The input light passing through the retardation device can be divided into a first component and a second component corresponding to the projections of the input light onto the first and second polarization eigenstates SOPf, SOPs, respectively. The two components of light passing through the retardation device experience a different refractive index. Without loss of generality, the first polarization eigenstate SOPf can be assumed to be a fast axis associated with a lower refractive index, and the second polarization eigenstate SOPs as the slow axis associated with a higher refractive index. Accordingly, the first component of light propagates faster in the birefringent medium than the second component. If the input polarization state SOPi is collinear with one of the polarization eigenstates SOPf, SOPs, the polarization state of an output light, i.e. light exiting the retardation device, is different from the polarization state of the input light.

The "delay" refers to retardation of one of the first and second light components compared to the other light component while propagating in the retardation device. The phases of the two components shift with respect to each other due to the delay. Also, a total phase of the electromagnetic field of the output light is shifted relative to the total phase which the output light would have upon passing through the same distance in vacuum. The longer the light propagates through the retardation device, the greater becomes said delay. Light passing through the retardation device hence acquires both a change in the polarization state and a phase shift.

In another example, the retardation device may comprise another means to alter the polarization state of light passing through.

In addition to the dynamic phase shift, light passing through the retardation device experiences a "geometric phase shift", which is also referred to as Pancharatnam-Berry phase. A more detailed explanation and mathematical discussions are provided by J. C. Gutierrez-Vega, "Pancharatnam-Berry phase of optical systems", Optics Letters 36, 7 (Apr. 1, 2011) 1143.

Light passing through a birefringent medium can be described within the Jones calculus. For example, the birefringent medium may show no polarization dependent loss (PDL), i.e. loss factors associated with the refractive indices of the birefringent medium may be equal. The input light $\vec{E}_{in}$ is transformed to $\vec{E}_{out}$ upon passing through the birefringent medium, mathematically described by the Jones matrix J as follows:

$$\vec{E}_{out} = J\vec{E}_{in} = \begin{bmatrix} \mu_f|q_x|^2 + \mu_s|q_y|^2 & (\mu_f - \mu_s)q_x q_y^* \\ (\mu_f - \mu_s)q_x^* q_y & \mu_s|q_x|^2 + \mu_f|q_y|^2 \end{bmatrix}$$

$$\begin{bmatrix} \cos(\theta_{in})\cos(\varepsilon_{in}) - i\sin(\theta_{in})\sin(\varepsilon_{in}) \\ \sin(\theta_{in})\cos(\varepsilon_{in}) + i\cos(\theta_{in})\sin(\varepsilon_{in}) \end{bmatrix} =$$

$$e^{i(\phi_{dyn}+\phi_{geo})}\begin{bmatrix} \cos(\theta_{out})\cos(\varepsilon_{out}) - i\sin(\theta_{out})\sin(\varepsilon_{out}) \\ \sin(\theta_{out})\cos(\varepsilon_{out}) + i\cos(\theta_{out})\sin(\varepsilon_{out}) \end{bmatrix}$$

where $\mu_f$ and $\mu_s$ are complex eigenvalues of the Jones matrix J, $\theta_{in}$, $\theta_{out}$ are the azimuth angles of the input and output lights and $\varepsilon_{in}$, $\varepsilon_{out}$ are the ellipticities of the input and output lights. Without loss of generality, the complex eigenvalues $\mu_f$ and $\mu_s$ indicate a change of intensity and phase of the light component corresponding to the first and second polarization eigenstates SOPf and SOPs. In the following, $\mu_f$ and $\mu_s$ are respectively referred to as a first and a second loss factor of the retardation device. The orthonormal eigenvectors of the Jones matrix J are the Jones vectors $q_f$, $q_s$:

$$q_f = \begin{bmatrix} q_x \\ q_y \end{bmatrix} \text{ and } q_s = \begin{bmatrix} q_y^* \\ q_x \end{bmatrix}$$

The Jones vectors can be transformed to the respective Stokes vectors $Q_n$ as follows:

$$\vec{Q}_n = \begin{bmatrix} q_n^{*t} \sigma_1 q_n \\ q_n^{*t} \sigma_2 q_n \\ q_n^{*t} \sigma_3 q_n \end{bmatrix} ; n = f, s$$

where $\sigma_1$-$\sigma_3$ are the Pauli matrices. The Stokes vectors $\vec{Q}_n$ contain three-dimensional, real values. Light passing through a birefringent medium without PDL acquires the following phase shift $\phi$, according to the above cited paper by Gutierrez-Vega:

$$\phi = \arg(\mu_f + \mu_s + (\mu_f - \mu_s)\vec{A}\vec{Q}_n) =$$
$$\arg\left(\frac{\det(J)}{2}\right) + \frac{\Omega_{ABQ} - \Omega_{BA(-Q)}}{4} = \phi_{dyn} + \phi_{geo}$$

where arg() is an argument function, det() a determinant function, $\vec{A}$ the Stokes vector of the polarization state of the input light and $\Omega_{XYZ}$ the solid angle corresponding to a surface formed by positions X, Y and Z on a Poincare sphere. $\phi_{dyn}$ and $\phi_{geo}$ respectively correspond to the dynamic and geometric phase shift. For more general cases where the PDL is nonzero, see above mentioned Gutierrez-Vega paper.

FIGS. 17 and 18 show each a Poincare sphere which visualizes polarization states in spherical coordinates. According to the Stokes' parametrization of polarization states, the Cartesian axes S1, S2 and S3 correspond to vertical/horizontal linear polarization, ±45° linear polarization and left-right-hand circular polarization, respectively. Accordingly, polarization states on the equatorial plane, i.e. the S1-S2 plane, are linearly polarized. All the polarization states between the equatorial plane and each of the poles are elliptically polarized, as illustrated in FIG. 17. This description also applies to the Poincare spheres shown in FIGS. 19 to 28.

As mentioned above, the polarization state of light is generally elliptical. As shown in FIG. 17, the major and minor axes of the ellipse are perpendicular to each other. The ellipticity ε of the polarization state is defined based on the ratio of the semi-axes. The azimuth angle θ indicates the offset angle of the major axis from the S1 axis. On the Poincare sphere and in the Stokes parametrization, both the ellipticity ε and the azimuth angle θ are twice as large as in the Jones calculus, as indicated by "2ε" and "2θ" in FIG. 17.

With reference to FIG. 18, the input light has a certain input polarization state SOPi, which is elliptical. The polarization state of light is modified while passing through the retardation device having polarization eigenstates SOPf, SOPs that have a relative orientation with respect to each other. For example, the polarization eigenstates SOPf, SOPs are linearly polarized eigenstates being perpendicular to each other. In another example, the polarization eigenstates SOPf, SOPs are left- and right-handed circular polarization states. In the example shown in FIG. 18, the relative orientation between the polarization eigenstates SOPf, SOPs is 180° on the Poincare sphere, corresponding to a relative orientation of 90° in the Jones calculus. As shown further in FIG. 18, the polarization eigenstates SOPf, SOPs are in general elliptical.

Generally, the retardation device modifies the polarization state of light passing through as a function of, among others, an optical path length, the refractive indices and a relative orientation of the retardation device. As a result, the polarization state of light is converted from the input polarization state SOPi to the output polarization state SOPo upon passing through the retardation device.

If the retardation device is a half wave plate, as schematically shown in FIG. 18, the change of the polarization state from SOPi to SOPo corresponds to a counter-clockwise rotation (from a perspective from the outside of the Poincare sphere) of 180° on the Poincare sphere around a rotation axis, which is defined by the direction of SOPf.

In FIGS. 18 to 23, a trace of the change of the polarization state of light while propagating in the retardation device is visualized by a dotted line connecting SOPi and SOPo. In FIG. 18, the polarization state of light propagating in the retardation device changes from initially elliptical at SOPi over linear when crossing the S1-S2 plane, over differently elliptical on the southern hemisphere, over linear when crossing the S1-S2 plane again, and eventually to elliptical on the northern hemisphere at SOPo.

Herein and in the following, the description refers to the first polarization eigenstate SOPf of the retardation device without loss of generality. It is understood that same or similar effects can be achieved with reference to the second polarization eigenstate SOPs as well.

FIGS. 19 to 21 show a Poincare sphere, wherein the retardation device is a half wave plate with the polarization eigenstates SOPf, SOPs being aligned along the S3 axis corresponding to left- and right handed circular polarization states.

In FIG. 19, the input polarization state SOPi is on a great circle including the S1 and S3 axes. The output polarization state SOPo is located on the Poincare sphere corresponding to a 180°-rotation from the input polarization state SOPi around a connection line between the center of the Poincare sphere and the polarization eigenstate SOPf. In the examples shown in FIGS. 19 to 21, the rotation axis matches with the S3 axis corresponding to a half wave rotator.

In FIG. 20, the input polarization state SOPi is located where the positive S1 axis intersects the Poincare sphere. With the polarization eigenstate SOPf positioned on the S3 axis, the output polarization state SOPo is located where the negative S1 axis intersects the Poincare sphere. The relative orientation between the input polarization state SOPo and the polarization eigenstate SOPf is 90°, corresponding to 45° (i.e. π/4) in Jones calculus.

In FIG. 21, the input polarization state SOPi is offset from the input polarization state SOPi of FIG. 20. More specifically, the input polarization state SOPi of FIG. 21 is shifted toward a position where the positive S2 axis intersects the Poincare sphere. Accordingly, the output polarization state SOPo as shown in FIG. 21 is shifted in the opposite direction in the S1-S2 plane by the same amount.

As mentioned above, the polarization state of light is linear polarized if located on the S1-S2 plane. Hence, the shift of the polarization states SOPi, SOPo within the S1-S2 plane corresponds to a variation of the respective azimuth angle θ.

FIGS. 22 and 23 show polarization states SOPi, SOPo and polarization eigenstates SOPf, SOPs of the retardation device on a Poincare sphere. In FIGS. 22 and 23, the polarization eigenstate SOPf is 45°-linearly polarized state and is located at the intersection point of the positive S2 axis and the Poincare sphere. The input polarization state SOPi is linearly polarized and is located between SOPf and the intersection point of the positive S1 axis and the Poincare sphere.

According to the above described rule, the output polarization state SOPo is located at a position on the Poincare sphere corresponding to a 180°-rotation from the input polarization state SOPi around the connection line between the center of the Poincare sphere and SOPf.

In FIG. 22, the azimuth angle difference between the input polarization state SOPi and the polarization eigenstate SOPf is 15°. In FIG. 23, the azimuth angle difference between the input polarization state SOPi and the polarization eigenstate SOPf is 40°. Accordingly, the input polarization states SOPi and the output polarization states SOPo of FIGS. 22 and 23 are offset from each other in the S1-S2 plane. During the change of the polarization state from SOPi to SOPo (as traced by the dotted line), the polarization state of light changes from linear to elliptical and back to linear.

FIGS. 24 to 26 show the polarization states SOPi, SOPo, SOPf, SOPs on a Poincare sphere. In FIGS. 24 to 26, the input polarization state SOPi and the polarization eigenstate SOPf are the same as in FIG. 23: SOPi and SOPf are linear polarized states with an azimuth angle of 5° and 45°, respectively. While the retardation device of FIG. 23 is a half wave plate with a retardation of 180°, the retardation is 165° in FIG. 24, 175° in FIG. 25, and 185° in FIG. 26.

The above described rule for determining the respective output polarization state SOPo applies for retardations other than 180° accordingly. The respective output polarization state SOPo of FIGS. 24 to 26 is obtained on the Poincare sphere by a rotation from the input polarization state SOPi by the respective angle (165°, 175°, 185°) around the S2 axis, i.e. the SOPf direction. Accordingly, the output polarization states SOPo are located below the S1-S2 plane in FIGS. 24 and 25, while the output polarization state SOPo is located above the S1-S2 plane in FIG. 26.

Solid angles corresponding to a closed path over a subset the polarization states SOPi, SOPo, SOPf, SOPs on the Poincare sphere are associated with differently shaded surfaces in FIGS. 24 to 26. Following the mathematical discussions above, the geometric phase shift φgeo is determined by the difference Ω1-Ω2 of the solid angles Ω1=Ω(SOPi→SOPf) and Ω2=Ω(SOPo→SOPi→SOPf).

In FIGS. 24 to 26, the solid angle associated with a first trace SOPi→SOPo→SOPf is indicated by a darkly shaded area, while a lightly shaded area indicates the solid angle corresponding to a second trace SOPo→SOPi→SOPf. The first and second traces form the circumference of the darkly shaded area and the lightly shaded area, respectively.

The border between the darkly shaded and lightly shaded areas is formed by the shortest geodesic arc connecting SOPo and SOPi on the Poincare sphere. The geodesic arc is formed by a great circle on the Poincare sphere which goes through SOPo and SOPi.

In an angle view toward the center of the Poincare sphere from the outside, both the first and second traces of FIGS. 24 and 25 run counter-clockwise, which means that their corresponding solid angles being mathematically positive. However, the first and second traces of FIG. 26 run clockwise and their corresponding solid angles are mathematically negative.

When the retardation is below 180° and increases toward 180°, the darkly shaded area having vertex at SOPf decreases and the lightly shaded area having vertex at SOPs grows. When the retardation approaches 180°, and assuming that the loss factors μ1, μ2 are equal, the darkly shaded area is nearly zero and the lightly shaded area reaches almost a full hemisphere, $4\pi/2 \sim 2\pi$. Both paths associated with the darkly shaded area and the lightly shaded area bear a positive sign. The above described Φ equation therefore yields $\sim -\pi/2$.

When the retardation increases further and exceeds 180°, as shown in FIG. 26, the size of both areas remain almost the same, but their respective sign changes from +1 to -1, because the respective traces now run clockwise. The resulting Φ equals $-(-\pi/2)=\pi/2$. Hence, the sign flip causes a shift of the total phase from $-\pi/2$ to $\pi/2$, resulting in a phase shift of π when crossing 180°.

Another possibility for inducing a phase shift of π is given by changing the relative orientation between the input polarization state SOPi and the polarization eigenstate SOPf (or SOPs) of the retardation device, as will be described in connection with FIGS. 26 and 27.

In FIG. 26, the input polarization state SOPi is linearly polarized state with an azimuth angle θ of +5°. The polarization eigenstates SOPf, SOPs of the retardation device are linearly polarized states with an azimuth angle θ of +45° and -45°, respectively. The relative orientation between the input polarization state SOPi and the polarization eigenstate SOPf is therefore given by an azimuth angle difference of 42.5°. The retardation device is a half wave plate with a retardation of approx. 185°. Accordingly, the output polarization state SOPo after passing through the retardation device is located slightly above the S1-S2-plane with an azimuth angle θ of approx. +87.5°.

The solid angles corresponding to the paths on the Poincare sphere are associated with differently shaded areas. The darkly shaded area corresponds to the first trace SOPi→SOPo→SOPf. while the lightly shaded area corresponds to the second trace SOPo→SOPi→-SOPf. The border between the areas is determined by the shortest geodesic arc as described above.

The relative orientation between the input polarization state SOPi and the polarization eigenstato SOPf can be manipulated, for example, by changing the azimuth angle θ of the input polarization state SOPi and/or the polarization eigenstate SOPf. The input polarization state SOPi shown in FIG. 27 is different from FIG. 26 while the polarization eigenstate SOPf remains, or is maintained, constant. In FIG. 27, the input polarization state SOPi is a linearly polarized state with θ=-5°. The change from the SOPi of FIG. 26 to the SOPi of FIG. 27 corresponds to a shift by 10° in the S1-S2-plane toward the negative S2-direction.

With the polarization eigenstates being at ±45° in the S1-S2-plane, the output polarization state SOPi in FIG. 27 is located slightly above the S1-S2-plane with an azimuth angle θ of approximately -87.5°. The solid angles corresponding to the respective paths are indicated with differently shaded areas according to the above description. The shaded areas in FIG. 27 show that the solid angle corresponding to the first trace SOPi→SOPo→SOPf (darkly shaded area) almost covers a full hemisphere, while the solid angle corresponding to the second trace SOPo→SOPi→-SOPf shrinks to a crescent.

Hence, the solid angles corresponding to the first and second traces swap their sizes when the relative orientation between SOPi and SOPf crosses π/4, assuming that the retardation device has a retardation of 180°, e.g. the retardation device is a half wave plate. As is seen from the above, in theory it is possible to obtain a large phase shift in the amount of π in response to an infinitesimal change in the initial polarization state, i.e. from SOPi to SOP'i. Similarly, a large phase shift in the amount of a could also be obtained by an infinitesimal change in the delay associated with the retardation device. The present invention employs this principle to allow for a high "modulation leverage", i.e. a comparatively large change in the phase of the output light of a or at least close to due to a comparatively small change in the initial polarization state and/or the retardation associated with said retardation device.

The control device can be a processing unit or any other device having a certain processing power. For example, the control device may be a computing device. The control device can be located remotely from the phase modulation device and connected to it, for example, via a network.

Using prior art equipment, voltage requirements for changing the polarization state by a given polarization angle, and voltage requirements for changing the phase of a carrier signal by a similar amount are typically comparable. In other words, effecting the phase modulation by a polarization modulation does not per se allow for saving energy. However, as is seen from the above, using the phase modulation device of the invention, the relative orientation between SOPi and SOPf is varied by as little as 0.02 π in order to obtain a phase shift of π, such that the required change in polarization angle is smaller by two orders of magnitude than the affected change in phase angle. Accordingly, the voltages required for inducing the phase shift of π can be significantly reduced in comparison with the conventional phase modulation devices. The power consumption and/or the time requirement for inducing the phase shift can thereby be reduced using the above described phase modulation device.

According to some embodiments, the retardation device includes a birefringent optical device. Birefringence refers to the optical property of a medium having a refractive index depending on the polarization and propagation direction of light passing through. The birefringence usually is quantified as the maximum difference between refractive indices exhibited by the material. For example, crystals having asymmetric crystal structures or plastics under mechanical stress are often birefringent.

According to some embodiments, the delay corresponds to half a wavelength of the input light. Accordingly, the phases of the first and second components of the polarization state are shifted with respect to each other resulting in a phase difference of π. For example, the output polarization state SOPo is rotated with respect to the input polarization state SOPi, with both polarization states SOPi, SOPo being linear polarization states. On the Poincare sphere, the input polarization state is rotated around one of the optic axes of the retardation device by 180°.

According to some embodiments, the retardation device comprises a half wave plate.

As used here, a "wave plate" refers to an optical device or element that transforms the SOP of the input light to a polarization state of the output light, SOPo, by either changing the amplitude ratio between the first and second components and/or by delaying one of the first and second components in comparison with the other. Each wave plate has two polarization eigenstates SOPf and SOPs corresponding to a fast and slow axis with the respective azimuth angles θf and θs. The wave plate has a certain optical length and can introduce different delays δf, δs for the polarization components according to its fast and slow axis, respectively. The difference of these delays Δδ=δf−δs can be referred to as the birefringence of the wave plate.

In case that the PDL is nonzero, the intensity of SOPo may vary depending on which of SOPf, SOPs the SOPi is aligned to. [Elliptizität=o]

The half wave plate can comprise a birefringent material, such as quartz or mica. The half wave plate has a predetermined thickness as a function of the wavelength of the light and the difference of the refractive index.

According to some embodiments, the control device is configured to manipulate the polarization state SOPi of the input light.

The manipulation of the polarization state SOPi generally refers to altering the azimuth angle and/or the ellipticity of the polarization state SON of the input light. For example, a linear polarization state SOPi can be turned into a different linear polarization state. Further, a linear, circular or elliptical polarization state SOPi can be transformed into any other of linear, circular or elliptical polarization state. For this purpose, the control device can be configured to rotate the polarization plane of the input light.

According to some embodiments, the control device is configured to manipulate the polarization eigenstates SOPf, SOPs of said retardation device.

In particular, the manipulation may change the azimuth angle and/or the ellipticity of the respective polarization eigenstate SOPf, SOPs. For example, the azimuth angle of the retardation device may be changed simply by rotating the retardation device. Accordingly, the retardation device can be rotated around an axis parallel to the propagation direction of the input light. In particular, the retardation device may be rotated such that the azimuth angle θf and θs of one of the polarization eigenstates SOPf, SOPs is varied around π/4 from the input azimuth angle θi.

In other examples, the azimuth angle of the retardation device may be changed by exploiting electro-optical properties of or inducing a thermal stress to a birefringent medium of the retardation device.

According to some embodiments, the control device is configured to change the angle between the polarization state SOPi of the input light and one of the polarization eigenstates SOPf, SOPs from an angle below π/4 to an angle above π/4 and/or vice versa.

In particular, it is assumed that the loss factors μf and μs obtained from the Jones matrix of the retardation device are equal or nearly equal. If the loss factors differ from each other, the angle variation may be performed by the same absolute amount, however with respect to an angle that is offset from π/4. In order to obtain a reversion of the solid angles as described above, an angle between the polarization state SOPi of the input light and one of the polarization eigenstates SOPf, SOPs of the retardation device is 90° on the Poincare sphere, corresponding to 45° in the Jones calculus.

According to some embodiments, the control device is configured to manipulate an optical path length covered by light while passing through the retardation device.

Mathematically, the optical path length refers to a product of a geometric path length covered by the light in the retardation device and the corresponding refractive index. For example, the geometric path length covered by the light is varied. For example, the geometric path length can be varied by changing a thickness of a part of the retardation device which is penetrated by the light. Herein, the geometric light path may refer to a distance between a first position where the light enters the retardation device and a second position where the light exits the retardation device when the light propagates along a straight line. If the retardation device comprises a birefringent medium and/or a half wave plate, the length can refer to a corresponding distance in that birefringent medium or half wave plate.

According to some embodiments, the obtained phase shift is caused by a geometrical phase shift effect. The geometrical phase shift refers to $\phi_{geo}$, as explained above.

According to some embodiments, the above mentioned predetermined angle range is $\pi/4\pm10\%$, preferably $\pi/4\pm5\%$ and most preferably $\pi/4\pm2\%$. The predetermined angle is defined as:

$$L(SOP_f, SOP_i) = \text{acos}\left(\frac{SOP_f \cdot SOP_i}{(SOP_f \cdot SOP_f)(SOP_i \cdot SOP_i)}\right).$$

Herein, the polarization states SOPi, SOPf and SOPs are expressed by complex two dimensional Jones vectors. The dot (•) represents the complex dot product.

In particular, a first loss factor µf and a second loss factor µs corresponding to the first and second polarization eigenstates SOPf, SOPs, respectively, are equal or differ from each other by 5% or less. If the difference between the loss factors µf and µs is larger, a reference angle, here $\pi/4$, may be shifted.

Generally, the above described scheme for inducing the phase shift of $\pi$ is not limited to a certain wavelength range, i.e. the input light may have any wavelength available. However, according to some embodiments, the wavelength of the input light is between 1.10-6 m to 2.10-6 m corresponding to conventional wavelength ranges in the optical communication. For example, the input light is provided in a wavelength range within the C band, S band or L band as defined in the optical communication. Furthermore, the input light can be referred to as a carrier signal in terms of the optical communication.

In particular, the input light may correspond to an electromagnetic signal in typical wavelength range employed in optical communication.

According to another aspect of the invention, a receiver for receiving a light signal, which is modulated with respect to its polarization is provided. The receiver comprises a retardation device characterized by first polarization eigenstate SOPf and second polarization eigenstates SOPs. Light polarized according to the second polarization eigenstate SOPs acquires, upon passing through the retardation device, a delay with regard to light polarized according to the first polarization eigenstate SOPf, which delay corresponds to $\lambda/2\pm30\%$, preferably $\lambda/2\pm20\%$ and most preferably $\lambda/2\pm10\%$. The retardation device is arranged to receive input light having a polarization state SOPi that defines an angle with respect to one of the first polarization eigenstate SOPf and second polarization eigenstate SOPs within a predetermined angle range.

According to some embodiments, said predetermined angle range is $\pi/4\pm10\%$, preferably $\pi/4\pm5\%$ and most preferably $\pi/4\pm2\%$. The predetermined angle is defined as:

$$L(SOP_f, SOP_i) = \text{acos}\left(\frac{SOP_f \cdot SOP_i}{(SOP_f \cdot SOP_f)(SOP_i \cdot SOP_i)}\right).$$

Herein, the polarization states SOPi, SOPf and SOPs are expressed by complex two dimensional Jones vectors. The dot (•) represents the complex dot product.

In particular, the azimuth angle of the polarization states SOPi, SOPf and/or SOPs may be varied within a small range, for example $\pm10°$, preferably $\pm5°$ and most preferably $\pm2°$, around the reference angle difference of $\pi/4$, assuming that the first loss factor µf and the second loss factor µs corresponding to the first and second polarization eigenstates SOPf, SOPs, respectively, are equal or differ from each other by 5% or less. If the difference between the loss factors µf and µs is larger, the reference angle may be shifted from $\pi/4$.

In particular, the receiver may be provided with a retardation device of one of the types recited above with reference to the modulation device. Providing the retardation device at the receiver rather than at the transmitter viz. its associated modulation device have the advantage that transmission errors, for example due to polarization crosstalk effects for long transmission distances, can be reduced because the transmitted signal carries only small variations of the polarization state instead of a phase shifts of $\pi$.

According to some embodiments, the receiver comprises a control device for adjusting the polarization eigenstates SOPf, SOPs of said retardation device such that a change in the polarization state SOPi of the received light signal due to said polarization modulation leads to a phase shift of a $\pm30\%$, preferably a $\pm20\%$ and most preferably a $\pm10\%$ of the output light of said retardation device.

The control device can be configured to maintain a predetermined azimuth angle difference between one of the polarization eigenstates SOPf, SOPs of the retardation device and a reference polarization state. This reference polarization state could e.g. be the average of the different SOPi, i.e. the input polarization states after acquiring different polarization modulations for generating the phase shift of a, or any other suitable reference polarization state. The input azimuth angle θi and/or one or both of the azimuth angles θf, θs is altered around the predetermined angle difference. In particular, the predetermined angle difference is 45°. The azimuth angle difference between the input polarization state SOPi and the respective polarization eigenstate (or optic axis of a birefringent medium) SOPf, SOPs can also referred to as orientation angle.

According to some embodiments, the control device is configured for adjusting the polarization eigenstates SOPf, SOPs by rotating said retardation device.

If the retardation device comprises a birefringent medium or a half wave plate, the control device is configured to rotate the birefringent medium or the half wave plate relative to the propagation direction of the input light.

According to a further aspect of the invention, a transmitter is provided comprising the above described phase modulation device.

According to another aspect of the invention, a phase modulating method is provided. The method comprises the steps of:

guiding polarized light through a phase modulation device according to one of the embodiments; and controlling at least one of:

a change of the angle between the polarization state SOPi of the input light and one of the polarization eigenstates SOPf, SOPs by less than $0.1*\pi$, preferably $0.05*\pi$ and most preferably $0.02*\pi$, or a change of the amount of said delay upon passing through said retardation device by less than $0.5*\lambda$, preferably $0.2*\lambda$ and most preferably $0.1*\lambda$, such that a phase shift of π±30%, preferably π±20% and most preferably π±10% on the output light is obtained.

In the phase modulation method of the invention, the phase modulation device may receive the input light as a carrier signal and impose phase shifts of a according to the modulation signal to be transmitted with the carrier signal. The angle difference between the input azimuth angle θi of the input polarization state SOPi and one or both of the azimuth angles θf, θs of the polarization eigenstates SOPf, SOPs is varied around the predetermined angle difference. In addition or alternatively, the amount of delay acquired by the light upon passing through the retardation device is varied.

In particular, the angle difference in azimuth may be varied within a small range, for example ±10°, preferably ±5° and most preferably ±2°, around a reference angle difference of π/4, assuming that the first loss factor μf and the second loss factor μs corresponding to the first and second polarization eigenstates SOPf, SOPs, respectively, are equal or differ from each other by 5% or less. If the difference between the loss factors μf and μs is larger, the reference angle may be shifted from π/4.

According to some embodiments, the above mentioned predetermined angle range is π/4±10%, preferably π/4±5% and most preferably π/4±2%. The predetermined angle is defined as:

$$L(SOP_f, SOP_i) = \operatorname{acos}\left(\frac{SOP_f \cdot SOP_i}{(SOP_f \cdot SOP_f)(SOP_i \cdot SOP_i)}\right).$$

Herein, the polarization states SOPf and SOPi are expressed by complex two dimensional Jones vectors. The dot (•) represents the complex dot product.

Using this method, the voltages required for inducing the phase shift of π can be significantly reduced in comparison with conventional phase modulation methods. The power consumption and/or the time requirement for inducing the phase shift can thereby be reduced using the above described phase modulation device.

According to some embodiments, the step of controlling the angle includes rotating the polarization state SOPi of the input light relative to the polarization eigenstates SOPf, SOPs of the retardation device.

In particular, the input polarization state SOPi is rotated around an axis parallel to the propagation direction of the input light. The rotation of the input polarization state SOPi is performed within a range of 0.1 π, preferably 0.05 π and most preferably 0.02 π above and below the predetermined azimuth angle as described above.

According to some embodiments, the step of controlling the angle includes rotating the retardation device relative to the polarization state SOPi of the input light.

The retardation device can include a birefringent device, in particular a half wave plate. The retardation device may be rotated around an axis parallel to the propagation direction of the input light.

According to some embodiments, the step of controlling the amount of said delay upon passing through said retardation device includes manipulating a length covered by light while passing through the retardation device.

The length covered by light can be manipulated, for example, by exploiting piezoelectric, electrooptical or thermal properties of a birefringent medium.

SHORT DESCRIPTION OF THE FIGURES

DESCRIPTION OF THE PREFERRED EMBODIMENTS

Figure 1:
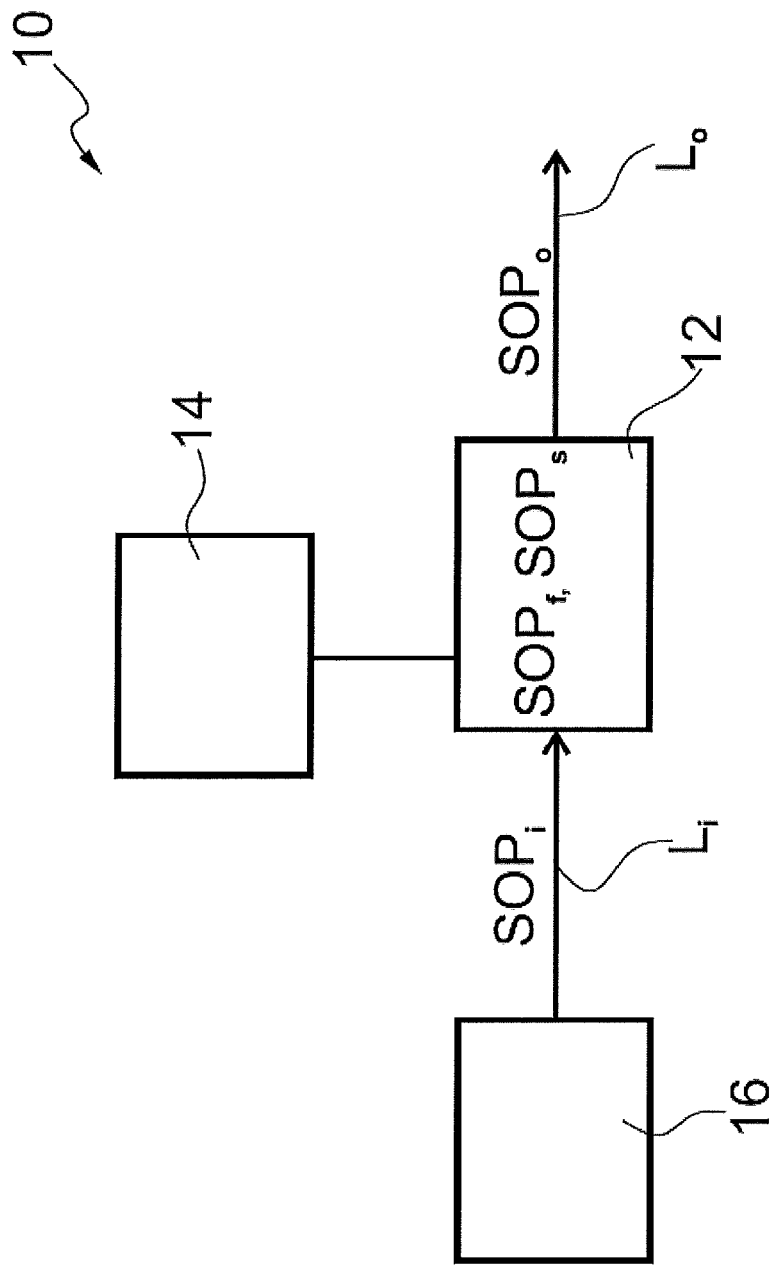
FIG. 1 is a schematic view of a first embodiment of a phase modulation device.

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates. Same or similar structural or functional features incorporated by different embodiments are indicated by using the same reference numerals in different figures.

In the following embodiments, an electric motor, a piezoelectric device, an optoelectronic device or a combination thereof can be employed to manipulate the respective retardation device. Such manipulation or modulation comprise, for example, rotating the retardation device, adjusting an offset angle, switching between different light paths, altering the optic axes, etc. In particular, the half wave plates, as will be described later, can be realized by a $LiNbO_3$ electro-optical modulator.

FIG. 1 shows a schematic view of a first embodiment of a phase modulation device 10.

The phase modulation device 10 comprises a retardation device 12 and a control device 14 communicatively coupled to each other. A light source 16 generates an input light Li having a defined frequency and defined amplitude. For example, the input light Li is a laser signal and the light source is a laser light source. The input light Li is polarized and has an input polarization state SOPi. The electromagnetic fields of the input light Li oscillates in planes perpendicular to its propagation direction. The SOPi can generally be elliptical having an ellipticity $\varepsilon i \neq o$ and an azimuth angle $\theta i \neq o$. For the sake of simplicity, it is assumed that the SOPi of the input light Li is linear. In the following, "angle" and "angle difference" of polarization states refer to the respective azimuth angle, unless indicated otherwise.

The retardation device 12 receives the input light Li from the light source 16. The retardation device 12 has a first polarization eigenstate SOPf and a second polarization eigenstate SOPs. Light propagating in the retardation device experiences different refractive indices along the polarization eigenstates SOPf and SOPs. The polarization eigenstates SOPf, SOPs are also referred to as ordinary and extraordinary optic axes of the birefringent retardation device 12. Generally, the first and second polarization eigenstates SOPf, SOPs are elliptical. Without loss of generality, the first polarization eigenstate SOPf and the second polarization eigenstate SOPs correspond to the fast axis and slow axis of the retardation device 12, respectively. For the sake of simplicity, it is assumed that the polarization eigenstates SOPf, SOPs are linear.

Light propagating in the retardation device 12 is divided to a first light component Lf and a second light component Ls corresponding to a projection of the polarization state of the light on the first polarization eigenstate SOPf and on the second polarization eigenstate SOPs, respectively. While propagating in the retardation device 12, the first and second light components Lf, Ls experience different refractive indices according to the fast and slow axes SOPf, SOPs. As a result, the second light component Ls acquires a delay with respect to the first light component Lf. Accordingly, the phase of the electromagnetic fields according to the first and second components Lf, Ls are shifted with respect to each other. Optionally, the amplitudes of both components Lf, Ls change differently while propagating in the retardation device 12.

More specifically, the second light component Ls, being aligned with the slow optic axis SOPs of the retardation device 12, acquires a delay of about half the wavelength $\lambda$ of the light with respect to the first light component Lf. For example, the delay amounts to $\lambda/2 \pm 30\%$, preferably $\lambda/2 \pm 20\%$ and most preferably $\lambda/2 \pm 10\%$. Accordingly, the phase of the second light component Ls is shifted by $\pi$ or approximately $\pi$ with respect to the first light component Lf.

As a result of the different delays acquired, the polarization state of the light propagating in the retardation device 12 is rotated. The azimuth angle of the rotation is twice the difference in azimuth angle between the input polarization state SOPi and the respective polarization eigenstate SOPf, SOPs. Accordingly, if the azimuth angle difference $\Delta\theta$ is 45°, the resulting rotation of the polarization state equals 90°.

The retardation device 12, the light source 16 and the optic fiber connecting the same are arranged such that the input polarization state SOPi is tilted by about $\pi/4 \pm 10\%$, preferably $\pi/4 \pm 5\%$ and more preferably $\pi/4 \pm 2\%$, with respect to the first polarization eigenstate SOPf of the retardation device 12 when received by the retardation device 12. Light exiting the retardation device 12 after passing through is referred to as output light Lo. The output light Lo has an output polarization state SOPo that is rotated around the input polarization state SOPi by about $\pi$.

The control device 14 performs at least one of the following actions:
  adjusting the angle difference $\Delta\theta$ between the input polarization state SOPi of the input light Li and the respective polarization eigenstate SOPf, SOPs of the retardation device 12; or
  adjusting the amount of the delay between the first and second light components Lf, Ls,
wherein the angle difference $\Delta\theta$ is adjusted within a range of $\pm 0.02 \pi$ around $\pi/4$ and/or the delay is adjusted within a range of $0.2\lambda$ around $\lambda/2$. These actions are performed to obtain a phase shift of a $\pm 30\%$ of the output light Lo with respect to a reference light beam with stable phase conditions.

If the delay of the retardation device 12 is adjusted to correspond to precisely $\lambda/2$, and the angle difference $\Delta\theta$ is changed from a value infinitesimally below 45° to a value infinitesimally above 45°, the resultant phase shift corresponds to precisely $\pi$. Similarly, if the angle difference $\Delta\theta$ is kept at 45° and the delay of the retardation device 12 is changed from a value infinitesimally below $\lambda/2$ to a value infinitesimally above $\lambda/2$, the resulting phase shift likewise corresponds to precisely $\pi$. However, embodiments of the invention are not limited to this scenario. Instead, it is possible that both, the delay and the angle difference change at the same time. Moreover, it is possible that the changes are not infinitesimal, and the delay does need not to precisely correspond to $\lambda/2$. Even though, it is possible to make comparatively small changes of the polarization difference and/or of the delay that would lead to a comparatively large change in the overall phase of the output light Lo, which is still close to $\pi$ or at least does not deviate from $\pi$ by more than 30%, exploiting the same physical effect that mathematically can be attributed to the geometric phase shift.

In summary, the output polarization state SOPo of the output light Lo can be imposed with a phase shift of π or at least nearly π according to a modulation signal by means of said control device. In this manner, light passing through the retardation device 12 can be modulated with respect to its phase. For example, each phase shift of π could refer to a "1" in terms of a binary modulation signal. In another example, predetermined numbers of consecutive phase shifts of π are respectively associated with a respective value. Optionally, eight consecutive periods of oscillation can be grouped to a byte.

Figure 2:
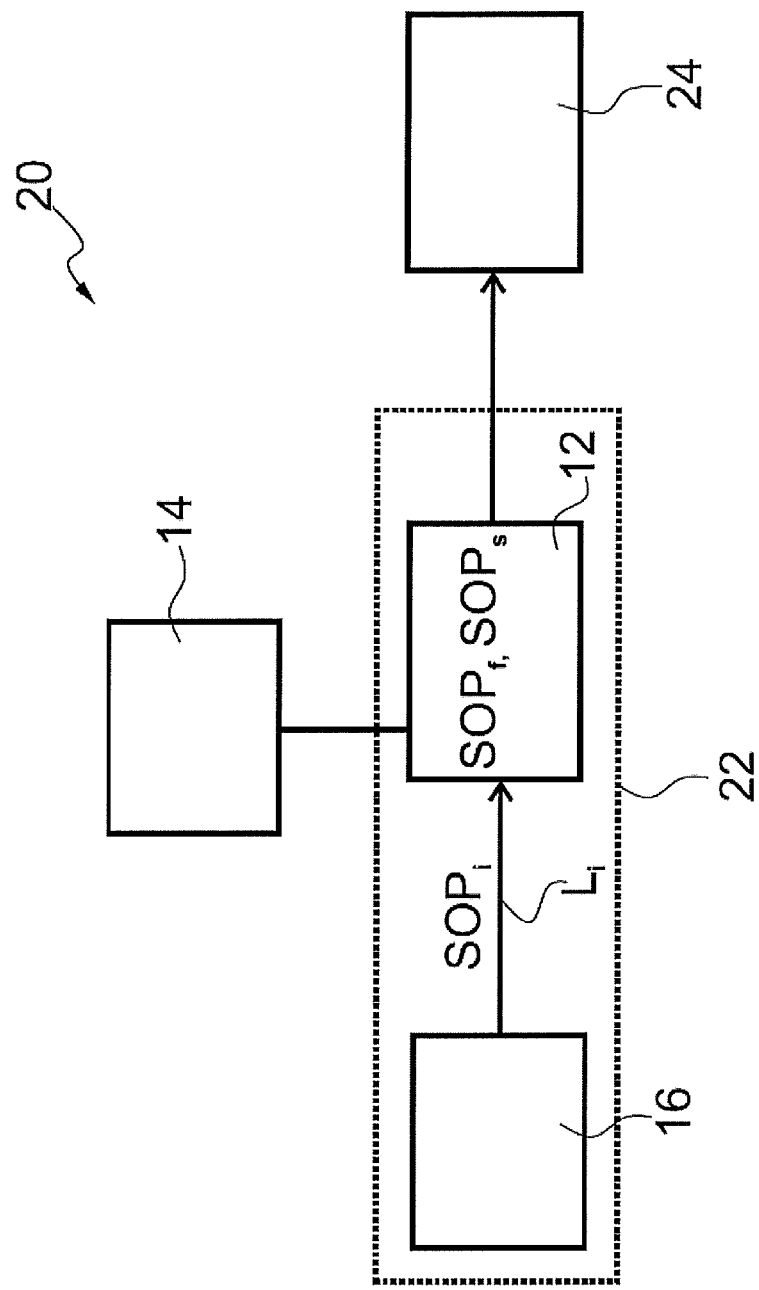
FIG. 2 is a schematic view of a second embodiment of a phase modulation device.

FIG. 2 shows a schematic view of a second embodiment of a phase modulation device 20.

The phase modulation device 20 has basically the same structure and elements as the phase modulation device 10 of FIG. 1. The phase modulation device 20 differs from the phase modulation device 10 in that the light source 16 and the retardation device 12 are provided within an integrated photonic circuit 22.

Further, the output light Lo having the output polarization state SOPo is emitted by the integrated photonic circuit 22 and transmitted via a transmission link to a receiver 24. Hence, the transmission link 24 receives the output light SOPo carrying a phase modulated signal imposed with one or more phase shifts of π.

Figure 3:
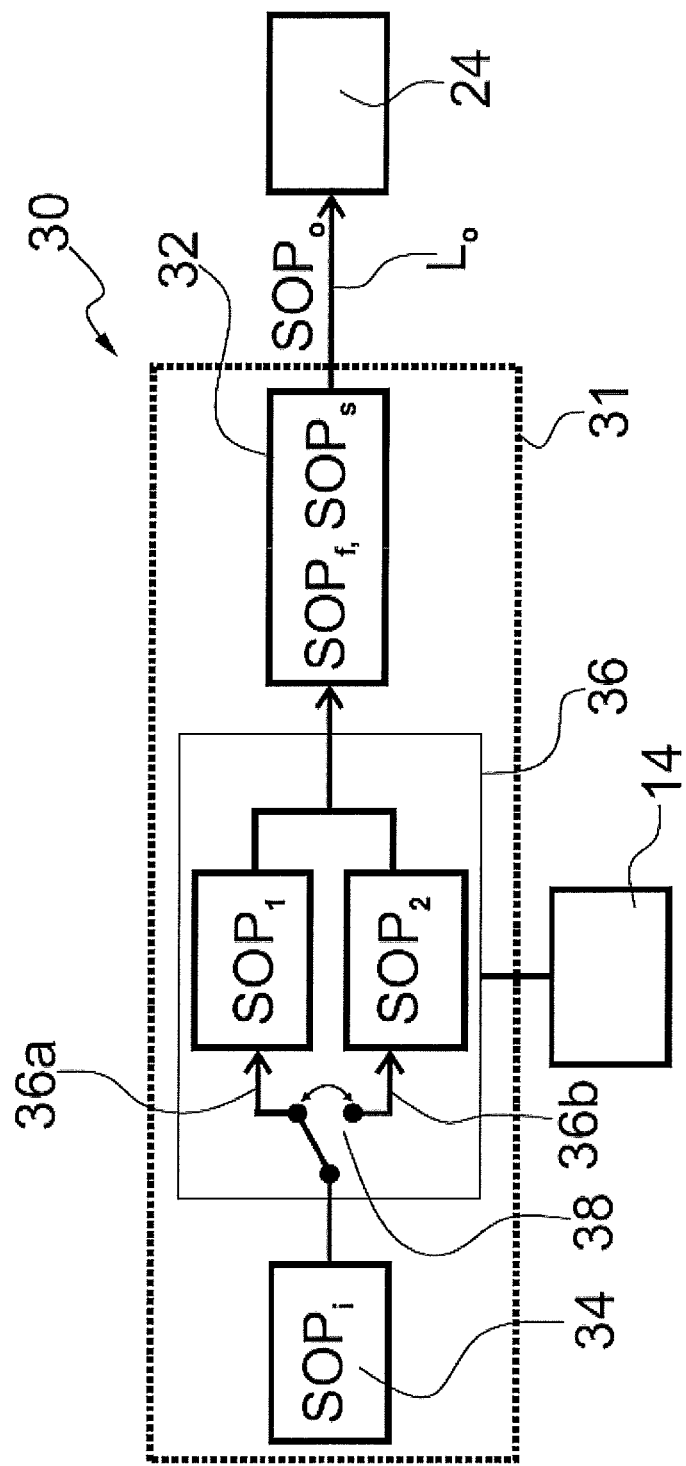
FIG. 3 is a schematic view of a third embodiment of a phase modulation device.

FIG. 3 shows a schematic view of a third embodiment of a phase modulation device 30.

The retardation device of the phase modulation device 30 is embodied by a birefringent optical device. In particular, the birefringent optical device is a half wave plate 32 having a fast axis SOPf and a slow axis SOPs. For example, both optic axes SOPf, SOPs are linear axes in the laboratory system.

The phase modulation device 30 comprises a laser beam source 34 which generates a monochromatic laser beam Li as the input light. The laser beam Li is linearly polarized with an azimuth angle θi. The half wave plate 32 is arranged such that the relative orientation of the fast and slow optic axes SOPf, SOPs with respect to the input polarization state SOPi is within a predetermined range.

A polarization controller 36 is connected in series between the half wave plate 32 and the laser light source 34. The polarization controller 36 selectively transforms the input polarization state SOPi into one of two different polarization states SOP1 and SOP2. The first polarization state SOP1 is offset from the fast polarization axis SOPf by π/4+δ1. The second polarization state SOP2 is offset from SOPf by π/4−δ2. Both δ1 and δ2 are angular offsets smaller than 0.1 π, preferably smaller than 0.05 π and more preferably smaller than 0.02 π.

For this purpose, the polarization controller 36 comprises two polarization branches 36a, 36b that can be selectively connected to the laser light source 34 and the half wave plate 32. A switching unit 38 switches between the two polarization branches 36a, 36b according to the modulation signal which is to be imposed to the laser beam Li.

The polarization state SOP1 or SOP2 is divided into two light components Lf and Ls according to the optic axes SOPf and SOPs of the half wave plate 32, as described above. The slow light component Ls acquires a delay with respect to the fast light component Lf, resulting in a rotation of the azimuth angle θo of the output light Lo.

The half wave plate 32, the laser light source 34 and the polarization controller 36 are implemented in an integrated photonic circuit 31. The laser beam Li from the laser light source 34 propagates via one or more waveguides in the integrated photonic circuit 31. Although not shown in FIG. 3 and following figures, further waveguides and optical elements, such as a collimator, a lens, an aperture, a mirror, a waveguide coupler, a splitter, another modulator or a combination thereof, may be arranged in the respective integrated photonic circuit.

The control device 14 is electrically or communicatively connected to the polarization controller 36. The control device 14 receives the modulation signal and decides which one of the two polarization branches 36a, 36b is to be connected to the laser light source 34 according to the modulation signal. As described above, the action of the control device 14 results in a phase shift of π or approximately π imposed on the output polarization state SOPo of the output light SOPo.

In another example, the switching unit 38 is provided between the outputs of the polarization branches 36a, 36b and the half wave plate 32. The additional switching unit selectively connects one of the polarization branches 36a, 36b with the half wave plate 32 according to the modulation signal. In yet another example, the switching unit 38 is provided at the input side as well as at the output side of the polarization branches 36a, 36b.

The output light SOPo carrying the modulation signal imposed as phase shifts of π is transmitted from the integrated photonic circuit 31 via the transmission link to a receiver 24 as described above.

Figure 4:
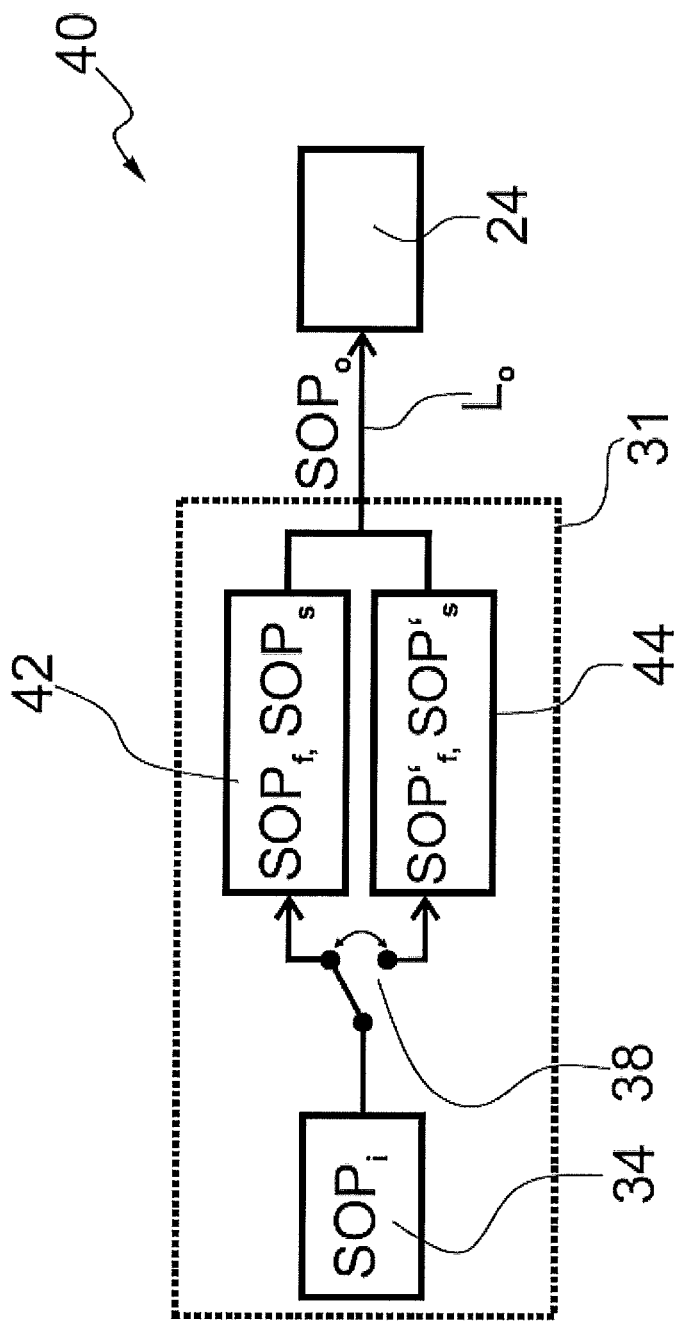
FIG. 4 is a schematic view of a fourth embodiment of a phase modulation device.

FIG. 4 shows a schematic view of a fourth embodiment of a phase modulation device 40.

The phase modulation device 40 comprises a first half wave plate 42 with fast and slow axes SOPf, SOPs and a second half wave plate 44 with fast and slow axes SOP'f, SOP's. The first and second half wave plates 42, 44 are arranged such that their respective fast axes SOPf, SOP'f are offset by π/4+δ1 and by π/4−δ2 with respect to SOPi, wherein both δ1 and δ2 are positive numbers less than 0.1π, preferably 0.05 π and most preferably 0.027π.

The half wave plates are of the same geometry and made of the same material such that the amount of the dynamic phase shift imposed on the light passing through both of the half wave plates 42, 44 is the same. By changing the light path between the two half wave plates 42, 44, a phase shift of π is imposed to the output polarization state SOPo due to the geometric phase shift.

The switching unit 38 selectively connects the laser light source 34 with one of the half wave plates 42, 44 according to the modulation signal. Optionally, the control device 14 (not shown in FIG. 4) can be connected to the switching unit 38 to receive the modulation signal and control the switching unit 38 accordingly.

Figure 5:
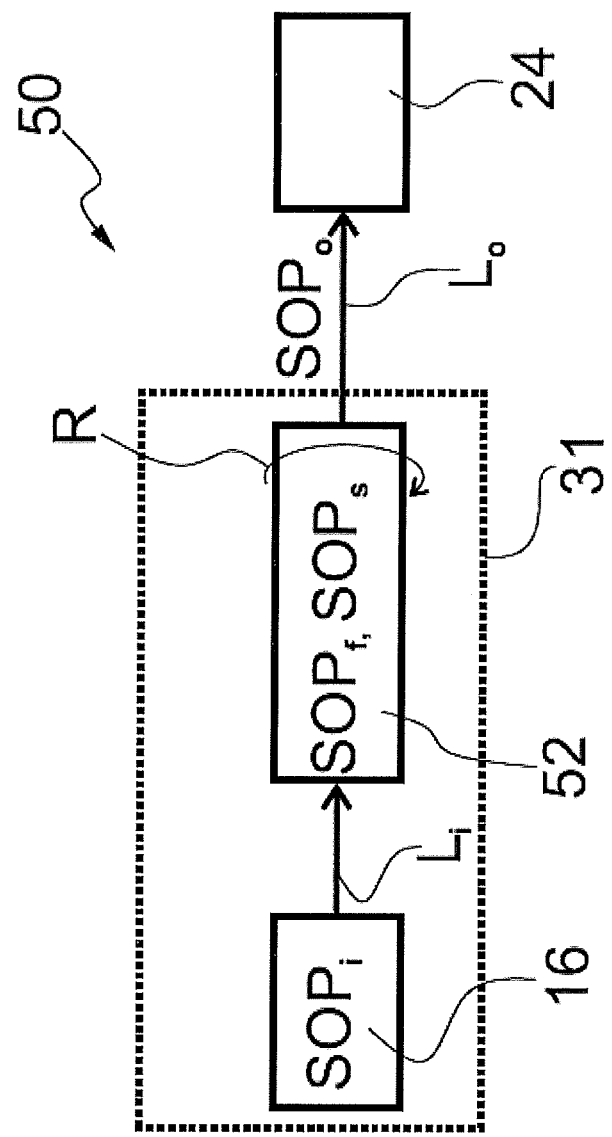
FIG. 5 is a schematic view of a fifth embodiment of a phase modulation device.

FIG. 5 shows a schematic view of a fifth embodiment of a phase modulation device 50.

A half wave plate 52 is connected to a laser light source 16. The half wave plate 52 is rotatable within an angle range of ±0.1 π, preferably ±0.05 π and most preferably ±0.02 π with respect to an offset angle of π/4 from the input polarization state SOPi of the input light Li. When the fast axis SOPf of the half wave plate 52 passes the offset angle of π/4, a phase shift of π±30%, preferably a π±20% and most preferably π±10% due to the geometric phase shift is imposed on the output polarization state SOPo.

An electric motor or a piezoelectric device (not shown) can be used to rotate the half wave plate 52 according to the modulation signal. Optionally, the control device 14 (not shown in FIG. 5) can be connected to the half wave plate 52 or the electric motor or the piezoelectric device for controlling the angular offset between the fast axis of the half wave plate 52 and the input polarization state SOPi.

As described above, the geometric phase shift of a can be obtained by altering the amount of the delay acquired by light upon passing through the retardation device. With reference to the phase modulation device shown in FIG. 1, different mechanisms or techniques can be employed to alter the amount of the delay.

Figure 6:
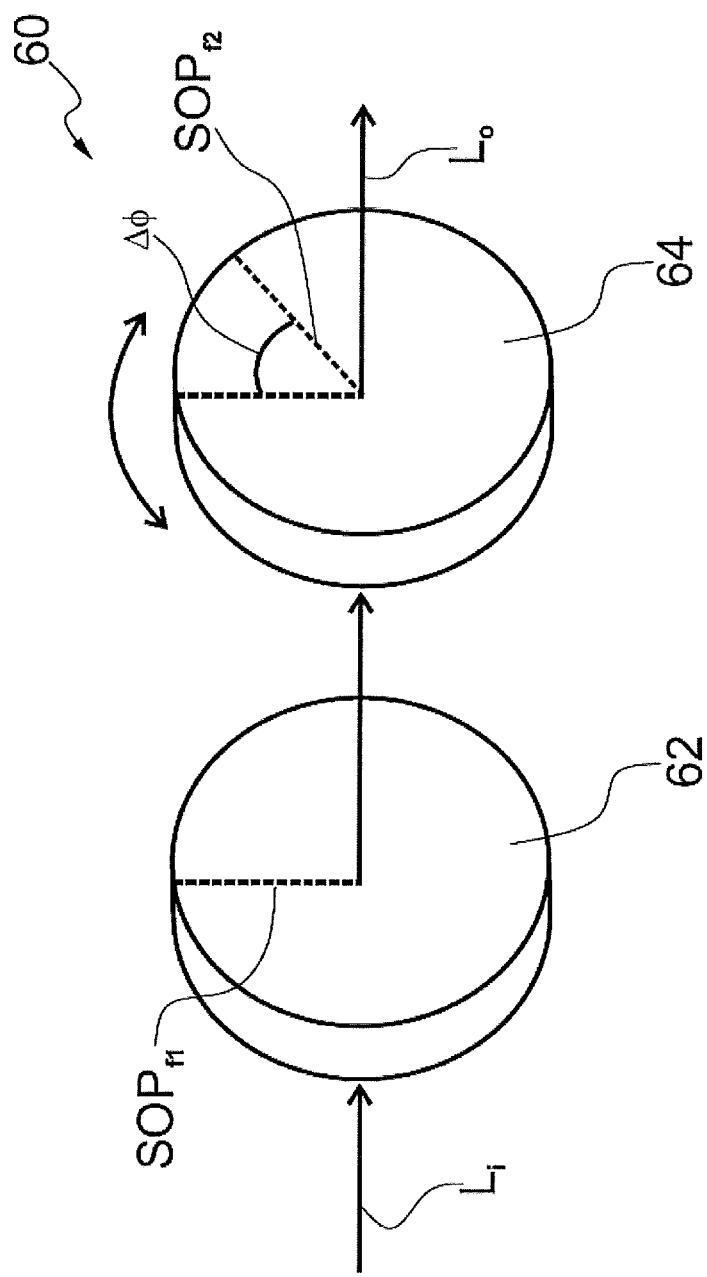
FIG. 6 is a schematic view of a first embodiment of a retardation device.

FIG. 6 shows a schematic partial view of a first embodiment of a retardation device 60.

The retardation device 60 comprises two cascaded linear wave plates 62, 64 arranged parallel to each other. A first wave plate 62 has a first fast axis SOPf1. A second wave plate 64 has a second fast axis SOPf2. The first and second fast axes SOPf1, SOPf2 are offset from each other by an angle $\Delta_\chi$. For example, the first and second wave plates 62, 64 are wave plates each having a retardation of greater than $\pi/2$.

The delay acquired by light passing through the cascaded half wave plates 62, 64 can be calculated using the following Jones matrix $$J = \begin{bmatrix} A & B \\ -B^* & A^* \end{bmatrix}$$

where $$A = \exp\left(\frac{i\delta_1}{2}\right)\left(\cos\left(\frac{\delta_2}{2}\right) + i\,\sin\left(\frac{\delta_2}{2}\right)\cos(2\Delta\chi)\right)$$

and $$B = i\,\exp\left(-\frac{i\delta_1}{2}\right)\sin\left(\frac{\delta_2}{2}\right)\sin(2\Delta\chi).$$

Herein, the respective orientation of the fast and slow axes of the combined retardation system is also changed. The input polarization state SOPi therefore needs to be adapted.

Therefore, the geometric phase shift of r can be induced by rotating at least one of the first and second wave plates 62, 64 with respect to each other within a range corresponding to an acquired delay of $\pm 0.5\lambda$, preferably $\pm 0.2\lambda$ and most preferably $\pm 0.1\lambda$.

Figure 7:
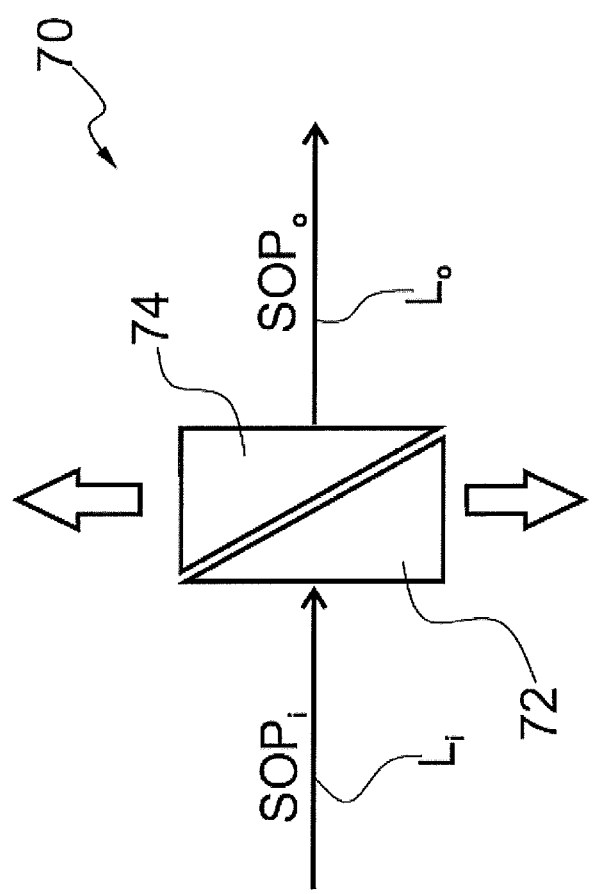
FIG. 7 is a schematic view of a second embodiment of a retardation device.

FIG. 7 shows a schematic partial view of a second embodiment of a retardation device 70.

The retardation device 70 comprises two wave plates 72, 74 shaped as complementary wedges. For example, the wave plates 72, 74 are above mentioned wave plates. One or both of the wave plates 72, 74 can be moved perpendicular to the propagation direction of the input light Li. A length covered by the light passing through the moved wave plate 72, 74 changes, thereby altering the amount of delay acquired by the light.

Therefore, the geometric phase shift of n can be induced by moving at least one of the first and second wave plates 72, 74 perpendicular to the propagation direction of the light within a range corresponding to an acquired delay of $\pm 0.5\lambda$, preferably $\pm 0.2\lambda$ and most preferably $\pm 0.1\lambda$.

Figure 8:
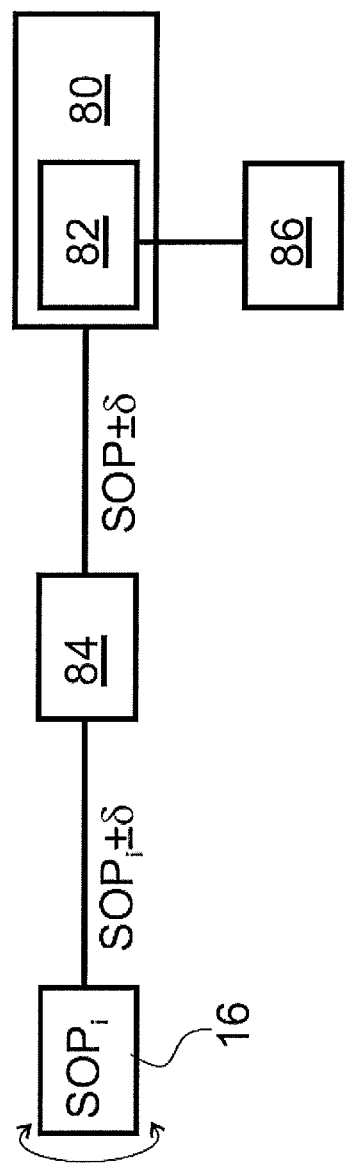
FIG. 8 is a schematic view of a first embodiment of a receiver.

FIG. 8 shows a schematic view of a first embodiment of a receiver 80 comprising a retardation device 82.

The laser light source 16 generates and emits a laser light as the input light Li as described above. The light source 16 is rotated according to the modulation signal by an azimuth angle $\delta$ of less than $0.02\,\pi$. Alternatively, the optic fiber is twisted at a position between the light source 16 in order to rotate the input light Li. The input light Li is received by a transmission link 84 which transmits the input light Li to the receiver 80.

The retardation device 82 comprises a half wave plate having a fast axis SOPf arranged offset by 45° from the incident input polarization SOPi. A control device 86 compensates fluctuations of the input polarization SOPi $\pm\delta$, for example due to environmental instabilities, and adjusts the orientation of the half wave plate 82.

Figure 9:
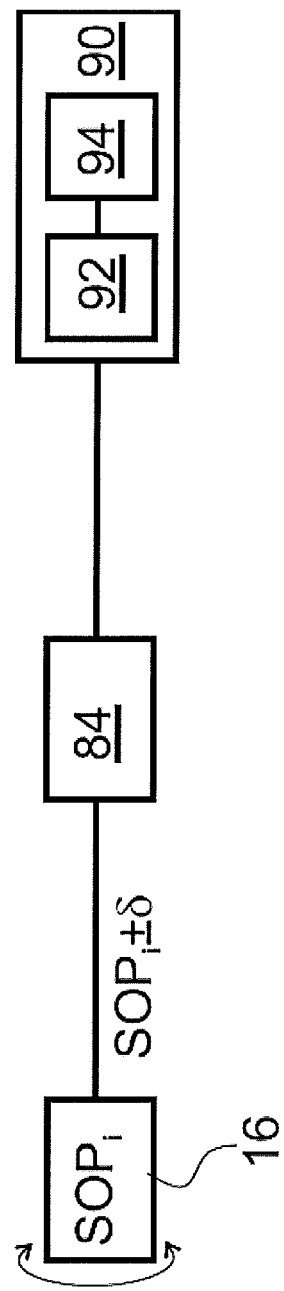
FIG. 9 is a schematic view of a second embodiment of a receiver.

FIG. 9 shows a schematic view of a second embodiment of a receiver 90 comprising a retardation device.

The laser light source 16 generates and emits the laser input light Li as described above. The light source 16 is rotatable and the input light Li is modulated with respect to its polarization by an azimuth angle $\delta$ as described above. The input light Li is then transmitted via the transmission link 84 to the receiver 90.

The receiver 90 comprises a polarization controller 92 and a half wave plate 94. The polarization controller 92 is arranged at a predetermined orientation with respect to the fast axis SOPf of the half wave plate 94. The polarization controller 92 is configured to recognize the polarization state SOPi of the received input light Li and convert the polarization state of light transmitted to the half wave plate 94 relatively to the fast axis SOPf of the half wave plate 94.

The variation of the polarization state SOPi of the input light Li received by the polarization controller 92 can differ from or be equal to the variation of the polarization state of the light transmitted to the half wave plate 94.

Accordingly, a signal carrying relatively small polarization modulation is transmitted to the receiver 80, 90. The phase shift of a or approximately a is obtained at the receiver after the received light passes through the retardation device comprised by the receiver 80, 90. This way, transmission errors can be reduced due to the relatively small difference in polarization states corresponding to different values.

FIGS. 10 to 15 show each a diagram of the total phase $\Phi$tot resulting from passing through a half wave plate as a function of the acquired retardation $\sigma$ and the negative cosine $-\beta$ of twice the relative orientation between the input polarization state SOPi and the polarization eigenstate SOPf of the half wave plate. The relative orientation refers not only to the azimuth angle difference $\Delta\theta$ but generally to an angle difference in the Jones calculus. $\beta$ equaling zero corresponds to a relative orientation of 45°. $\beta$ being +1 (i.e. $-\beta=-1$) corresponds to a relative orientation of 0°. $\beta=-1$ (i.e. $-\beta=+1$) means a relative orientation of 90°. The cosine function continuously declines from +1 to −1 corresponding to an increase of the relative orientation from 0° to 90°.

The retardation $\sigma$ in particular indicates the acquired delay between the light components upon passing through the half wave plate. The total phase $\Phi$tot refers to the total phase change the light acquires upon passing through the half wave plate. In the following, the cosine $\beta$ is also referred to as the relative orientation, as appropriate, for the sake of simplicity.

Figure 10:
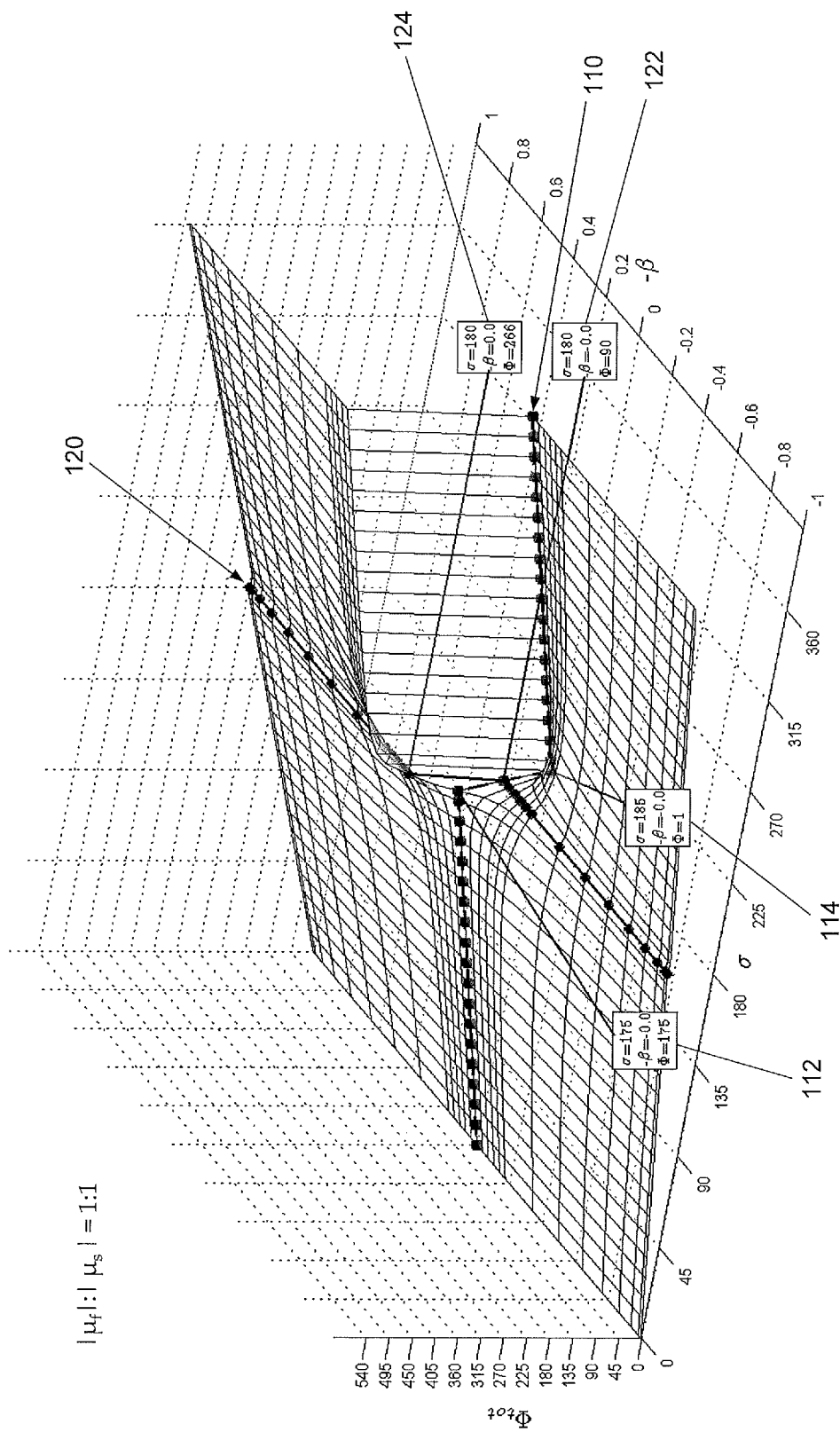
FIG. 10 is a diagram showing the total phase Φtot when a ratio (μf:μs) of the first loss factor μf to the second loss factor μs is 1:1.

In FIG. 10, the absolute values of the loss factors $\mu f$, $\mu s$ of the half wave plate are assumed to be equal, i.e. $|\mu f|$:$|\mu s|=1:1$. The resulting total phase $\Phi$tot spans an oblique plane that in general elevates as the retardation $\sigma$ increases.

In the trivial case that there is no retardation, i.e. $\sigma=0$, the total phase $\Phi$tot remains at zero regardless of the relative orientation $\beta$. In the right half of the diagram with the retardation being equal or greater than 180°, i.e. a 180°, the total phase $\Phi$tot jumps with a steep step at $\beta=0$. This steep step extends into the other half corresponding to $\sigma<180°$ to a little extent.

The steep step corresponds to the above describes geometric phase shift. A phase shift of $\pi$ (or approximately $\pi$) can be obtained, for example, by changing the retardation $\sigma$ over 180° while keeping the relative orientation β at 45° or vice versa. Hence, a first path 110 and a second path 120 can be defined which are representative for obtaining the phase shift of π (or approximately π) originating from the geometric phase shift. In FIG. 10 and in diagrams of FIGS. 11 to 16, the respective first and second paths 110, 120 are shown as bullets interconnected by a thick line.

The first path 110 corresponds to changing the retardation σ from below 180° to above 180° or vice versa, while the relative orientation β is fixed at 45°. The second path 120 corresponds to changing the relative orientation β from below 45° to above 45° or vice versa, while the retardation σ is fixed at 180°.

In addition, coordinates 112, 114, 122, 124 corresponding to positions in an immediate vicinity of the steep step are indicated. In particular, the coordinates 112, 114, 122, 124 are indicative of respective positions along the first and second paths 110, 120 immediately before and after the phase shift of π (or approximately π). Along the first path 110, the coordinates 112, 114 differ in the retardation σ of 175° and 185°. The total phase Φtot decreases from 175° to 1° when changing the coordinates from 112 to 114, resulting in a phase shift of 174° corresponding to 0.97π. Along the second path 120, the first coordinates 122 have a relative orientation β of slightly below o, while the second coordinates 124 have a relative orientation β of slightly above o. The total phase Φtot increases from 90° to 266° when changing the coordinates from 122 to 124, resulting in a phase shift of 0.98π.

As can be anticipated from the diagram shown in FIG. 10, the changes of the retardation a and the relative orientation β may be combined in order to obtain the phase shift of π (or approximately π). However, as can be seen in FIG. 10, not every path which crosses 180° in retardation a or o in cosine β on the plane will acquire the phase shift of π.

FIG. 10 presents results from simulations assuming that the first and second loss factors μf, μs respectively corresponding to the first and second optic axes SOPf, SOPs are equal. However, the loss factors μf, μs of a real system may differ from each other. Accordingly, the shapes of the geometric phase curves may differ from the diagram shown in FIG. 10 using real half wave plates. In particular, the phase shift of π may not occur as steep as shown in FIG. 10. Further, the geometric phase shift may be smaller than π.

FIGS. 11 to 15 each show simulation results as the ratio (μf:μs) of the first and second loss factors μf, μs is varied. In the diagrams of FIGS. 11 to 15, the retardation o axis is displayed on the right side and the cosine –β axis on the left side. The view angle is therefore rotated around a vertical axis from the diagram of FIG. 10.

Figure 11:
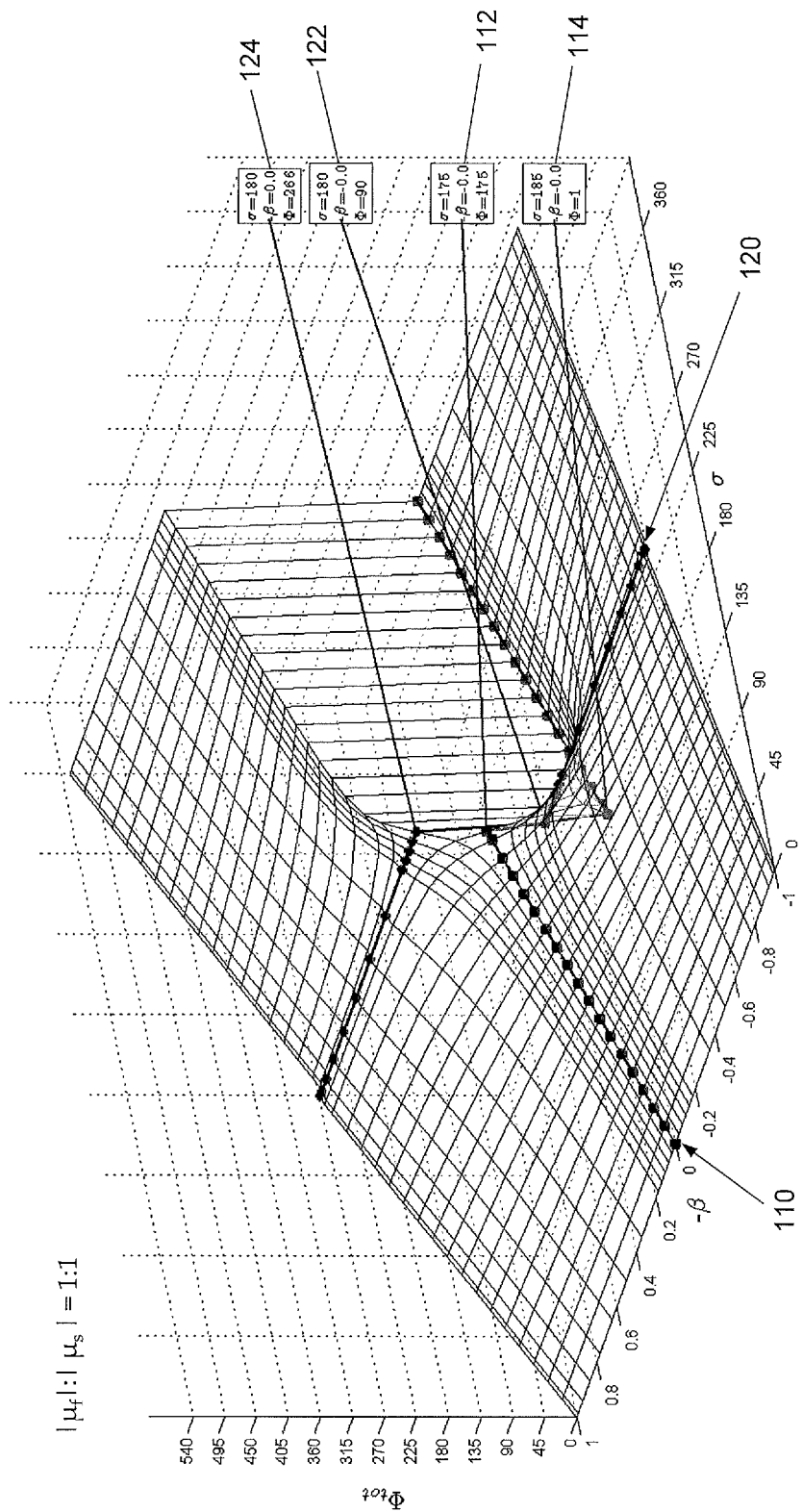
FIG. 11 is the diagram of FIG. 10 from another view angle.

In FIG. 11, the ratio μf:μs is 1:1 and the diagram of FIG. 11 therefore shows the same diagram as in FIG. 10 from a different view angle.

Figure 12:
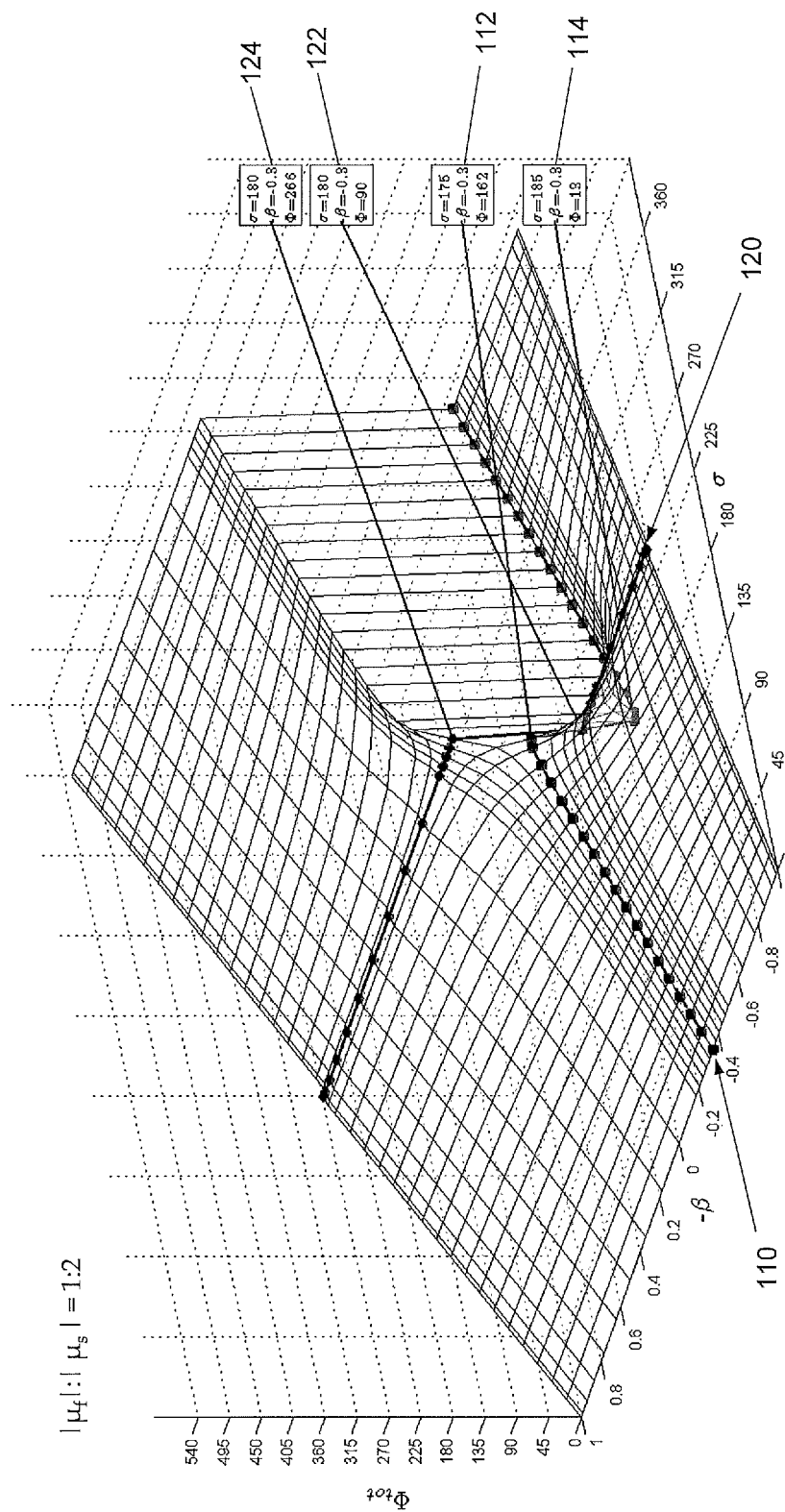
FIG. 12 is a diagram showing the total phase Φtot when the ratio (μf:μs) of the first loss factor μf to the second loss factor μs is 1:2.

FIG. 12 shows a total phase Φtot diagram, wherein the ratio μf:μs is 1:2. The steep step is shifted in positive β-direction (i.e. negative –β-direction), corresponding to a decrease of the relative orientation. At the same time, the respective positions of the first path 110 and second path 120 are not changed. The position and size of the steep step with respect to the retardation σ remains unchanged.

As indicated by the coordinates 122, 114, the steep step is located at β≈0.3 corresponding to a relative orientation of approx. 36°. Compared to the diagram shown in FIGS. 10 and 11, the change of the ratio μf:μs from 1:1 to 1:2 shifts the steep step by approx. 9° in the negative β-direction, i.e. at a decreased relative orientation.

Figure 13:
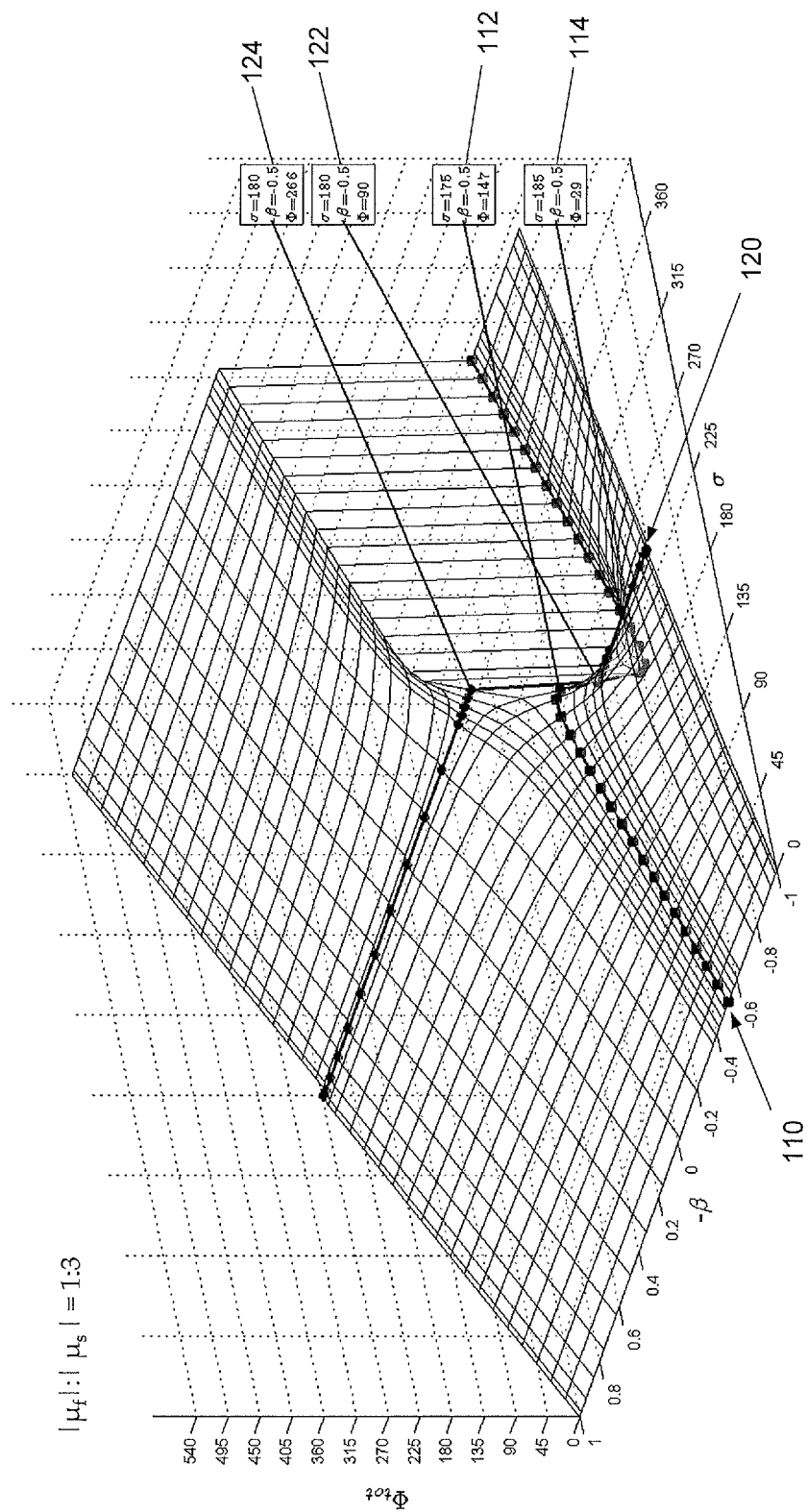
FIG. 13 is a diagram showing the total phase Φtot when the ratio (μf:μs) of the first loss factor μf to the second loss factor μs is 1:3.

FIG. 13 shows a total phase Φtot diagram, wherein the ratio μf:μs is 1:3. In comparison with the diagram of FIG. 12, the steep step is further shifted in positive β-direction. The positions of the first path 110 and the second path 120 are not changed. Also, the position and shape of the steep step with respect to the retardation σ remains unchanged. The corresponding β of 0.5 relates to a relative orientation of 30°.

Figure 14:
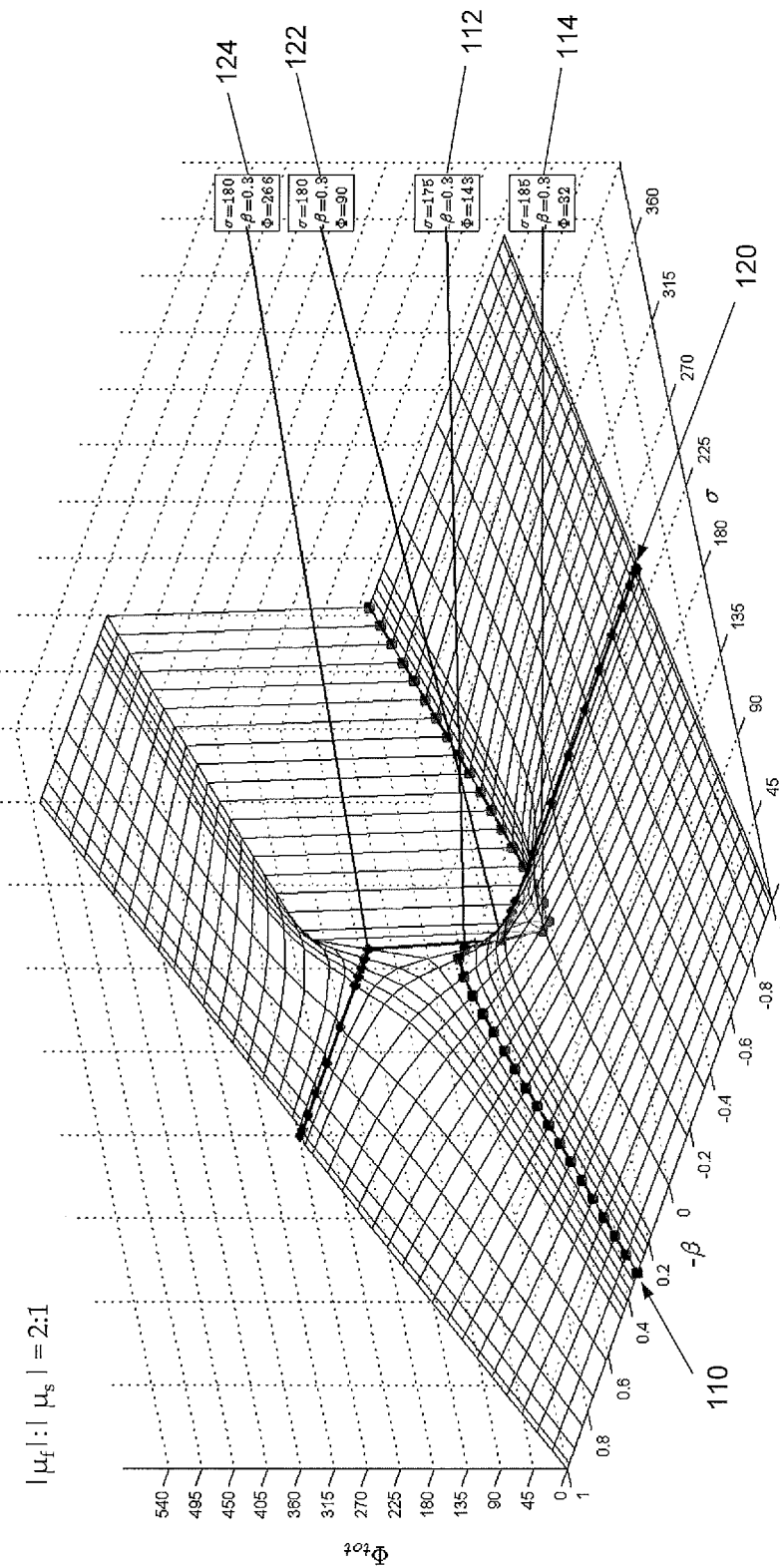
FIG. 14 is a diagram showing the total phase Φtot when the ratio (μf:μs) of the first loss factor μf to the second loss factor μs is 2:1.

FIG. 14 shows a total phase Φtot diagram, wherein the ratio μf:μs is 2:1. The steep step is shifted in negative β-direction (i.e. positive –β-direction) from the positions shown in FIGS. 10 to 13. The steep step is located at β=–0.3 corresponding to a relative orientation of approx. 54°.

Figure 15:
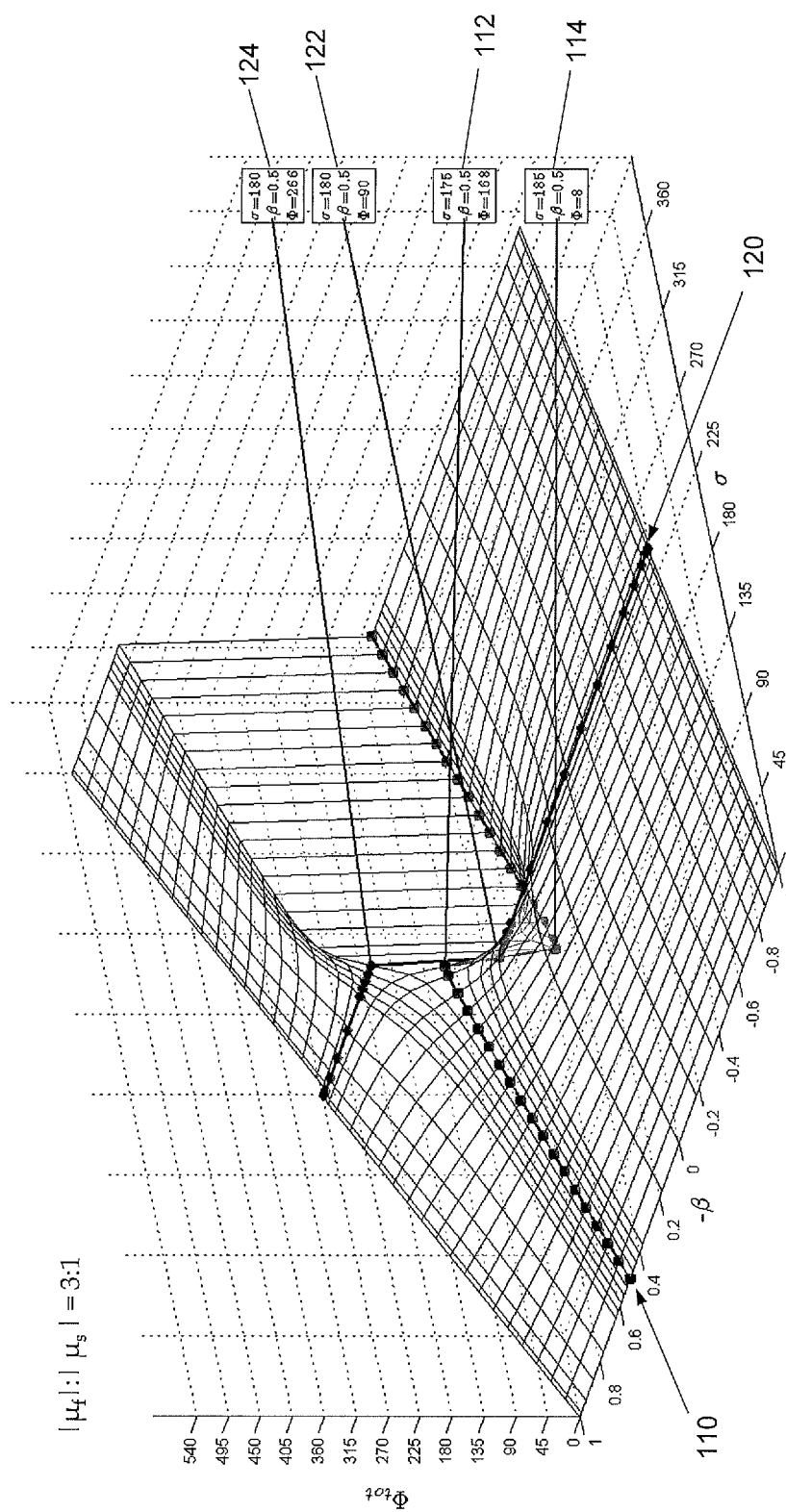
FIG. 15 is a diagram showing the total phase Φtot when the ratio (μf:μs) of the first loss factor μf to the second loss factor μs is 3:1.

FIG. 15 shows a total phase Φtot diagram, wherein the ratio μf:μs is 3:1. The steep step is shifted in negative β-direction (i.e. positive –β-direction) even further from the position shown in FIG. 14. The steep step is located at β=–0.5 corresponding to a relative orientation of approx. 60°.

Hence, increasing the second loss factor μs relative to the first loss factor μf results in shifting the phase shift of π (or approximately π) toward a position with increasing relative orientation. The occurrence and amount of the shift of the total phase Φtot by passing the steep step remain unaffected from the change of the ratio μf:μs of the loss factors.

Figure 16:
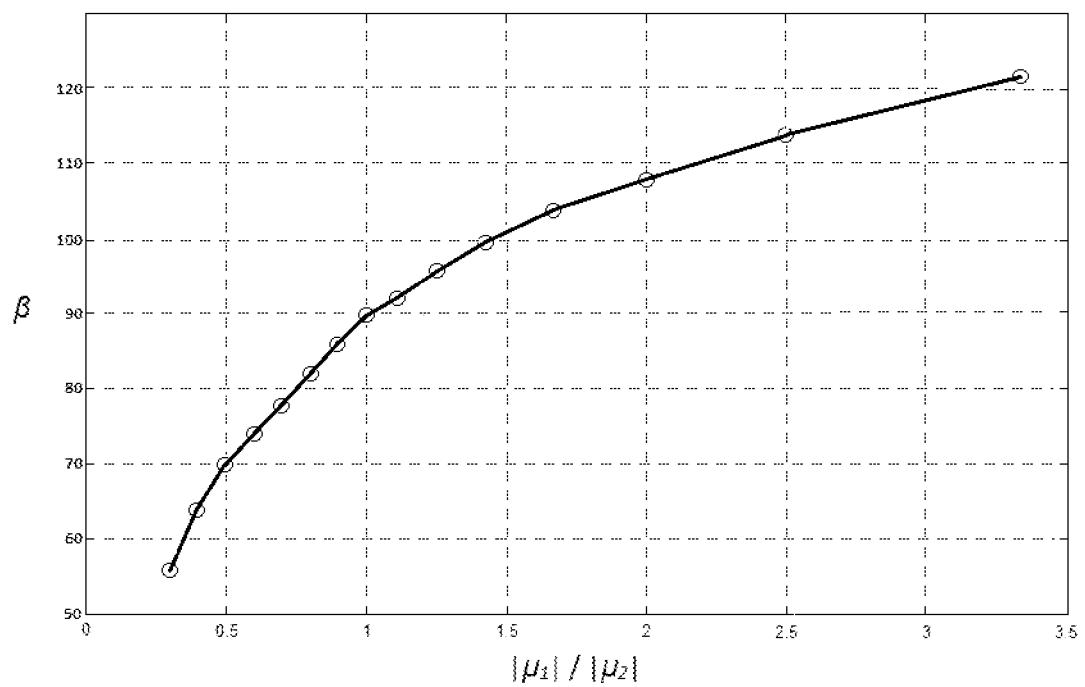
FIG. 16 is a diagram showing cosine of the relative orientation between the input polarization state and the polarization eigenstate of the retardation device as a function of the ratio (μf:μs) corresponding to the occurrence of a steep step in the total phase Φtot.
Figure 17:
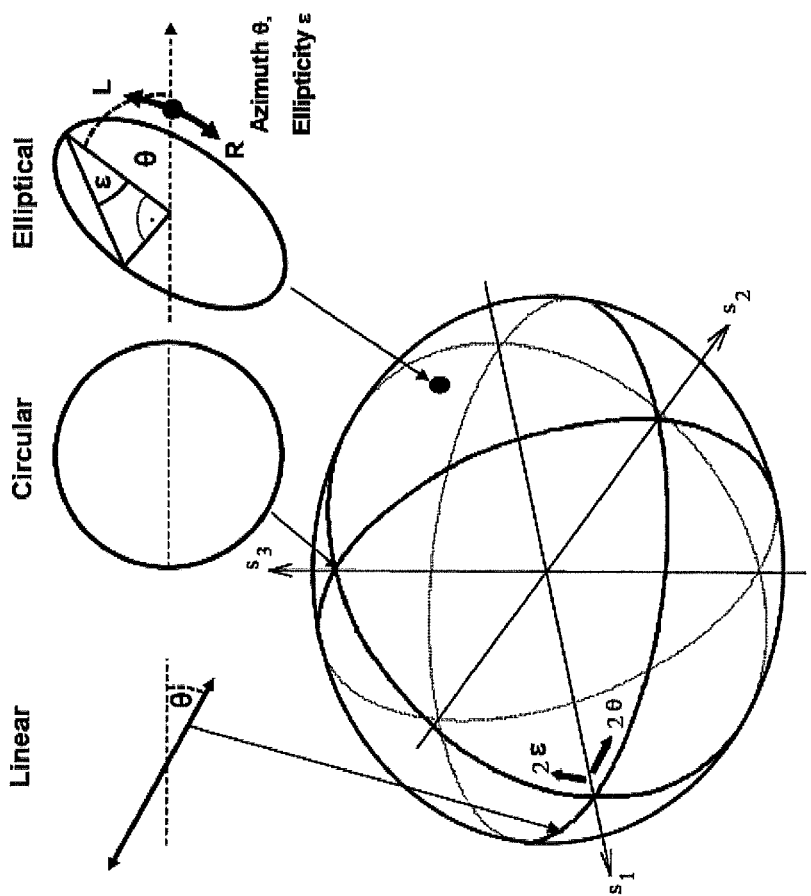
FIG. 17 illustrates the Poincare sphere.
Figure 18:
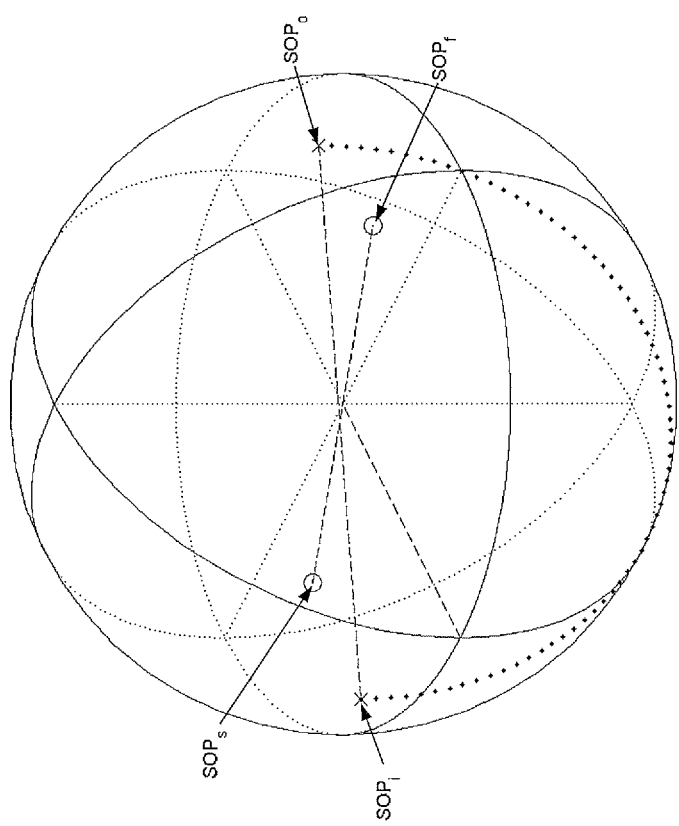
FIG. 18 illustrates the change of an input polarization state upon passing through a retardation device by means of a Poincare sphere.
Figure 19:
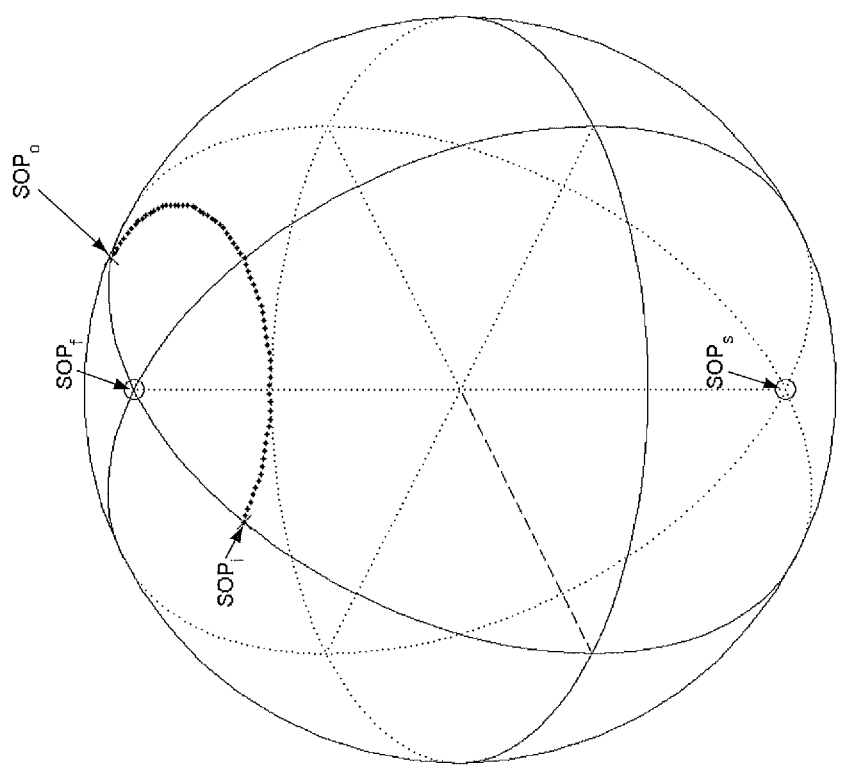
FIG. 19 illustrates the change of another input polarization state upon passing through the retardation device of FIG. 18 by means of a Poincare sphere.
Figure 20:
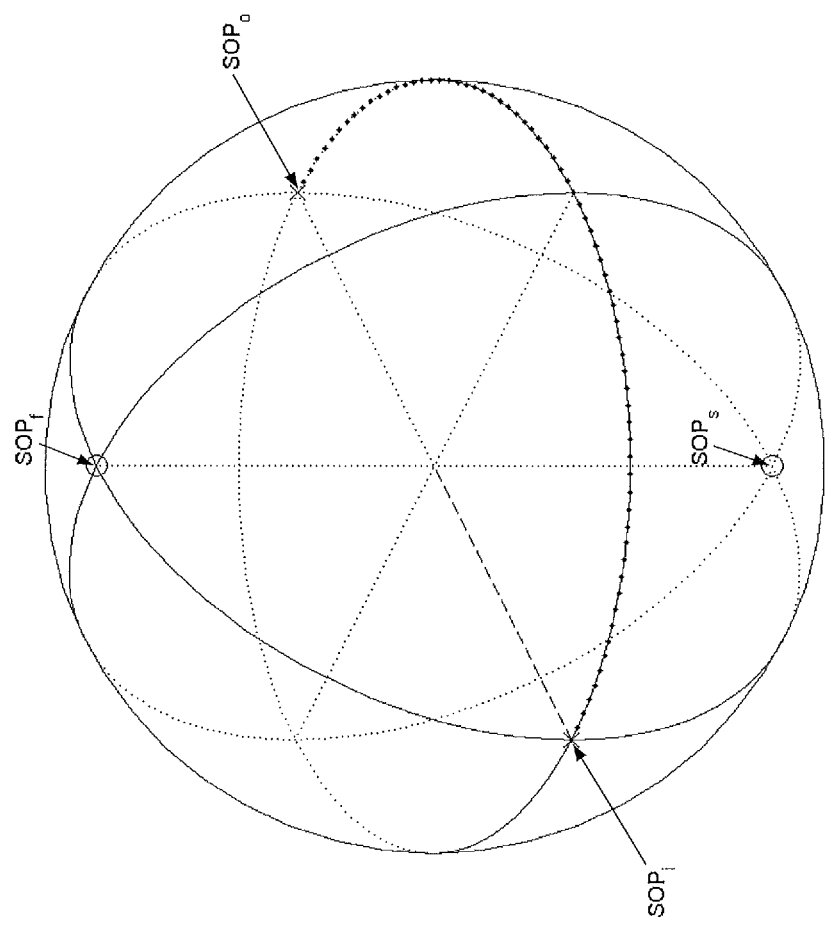
FIG. 20 illustrates the change of yet another input polarization state upon passing through the retardation device of FIG. 18 by means of a Poincare sphere.
Figure 21:
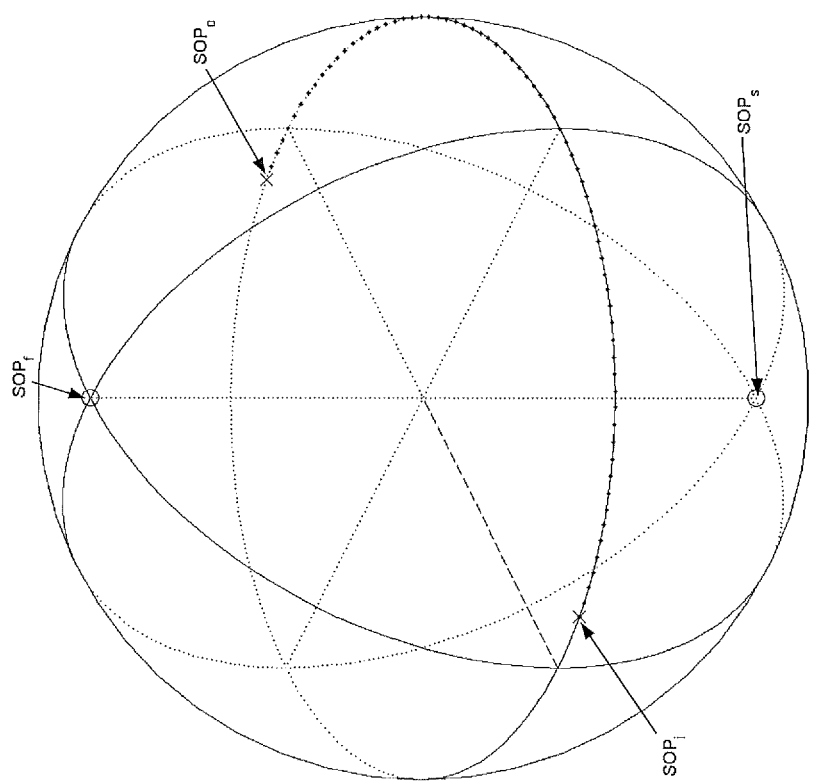
FIG. 21 illustrates the change of yet another input polarization state upon passing through the retardation device of FIG. 18 by means of a Poincare sphere.
Figure 22:
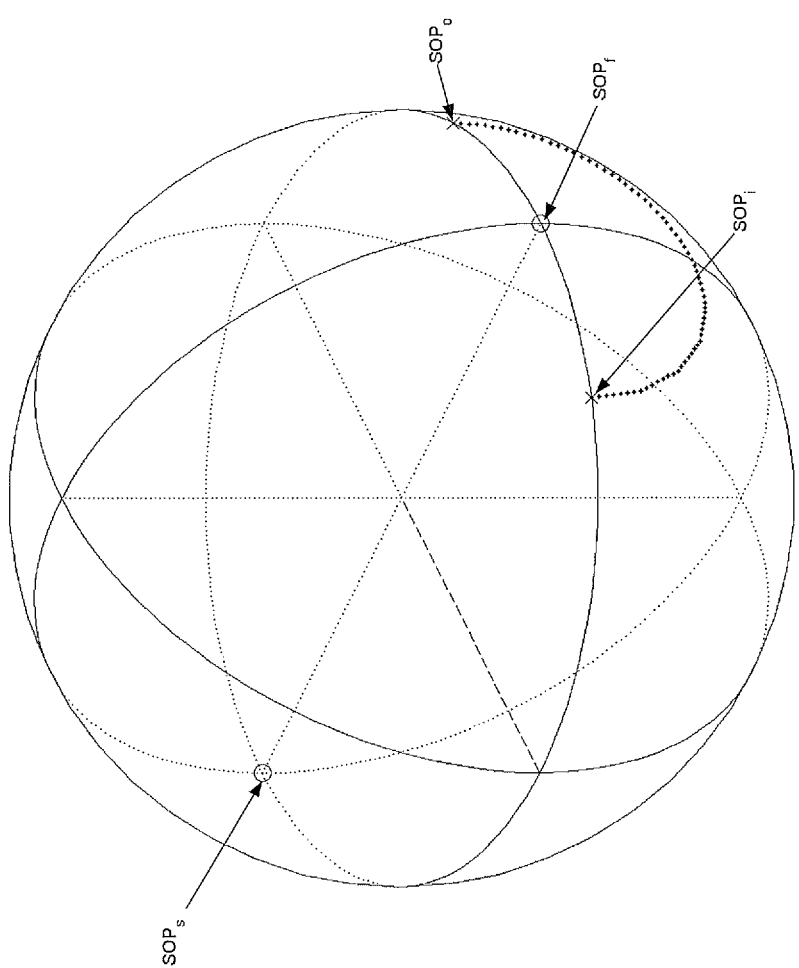
FIG. 22 illustrates the change of yet another input polarization state upon passing through another retardation device by means of a Poincare sphere.
Figure 23:
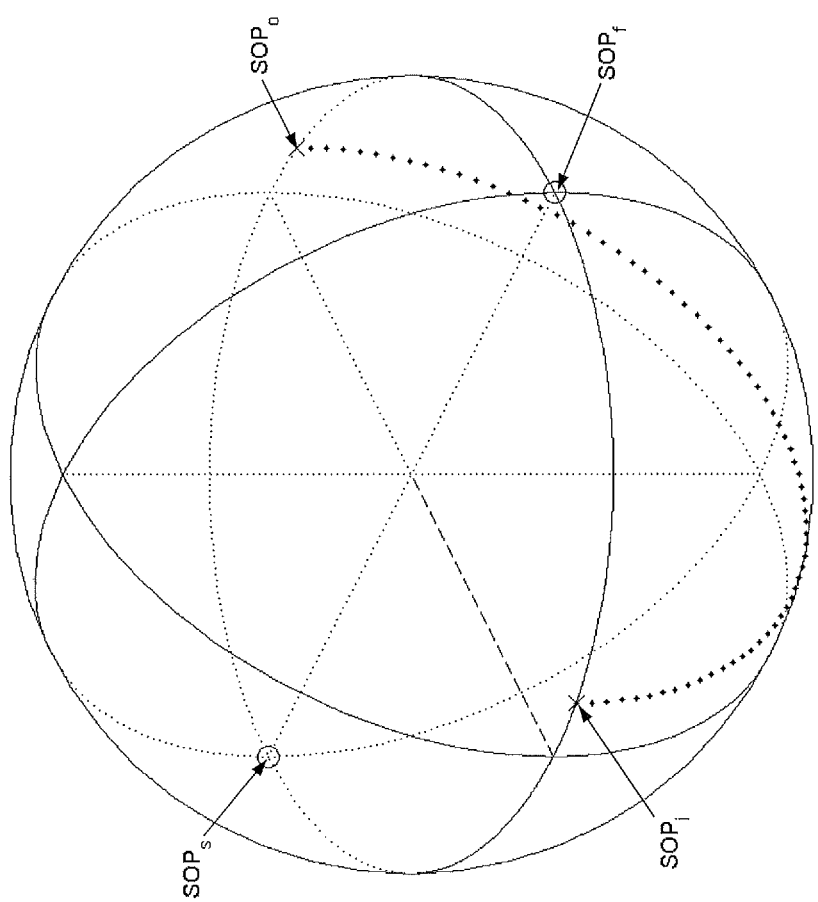
FIG. 23 illustrates the change of yet another input polarization state upon passing through the retardation device of FIG. 22 by means of a Poincare sphere.
Figure 24:
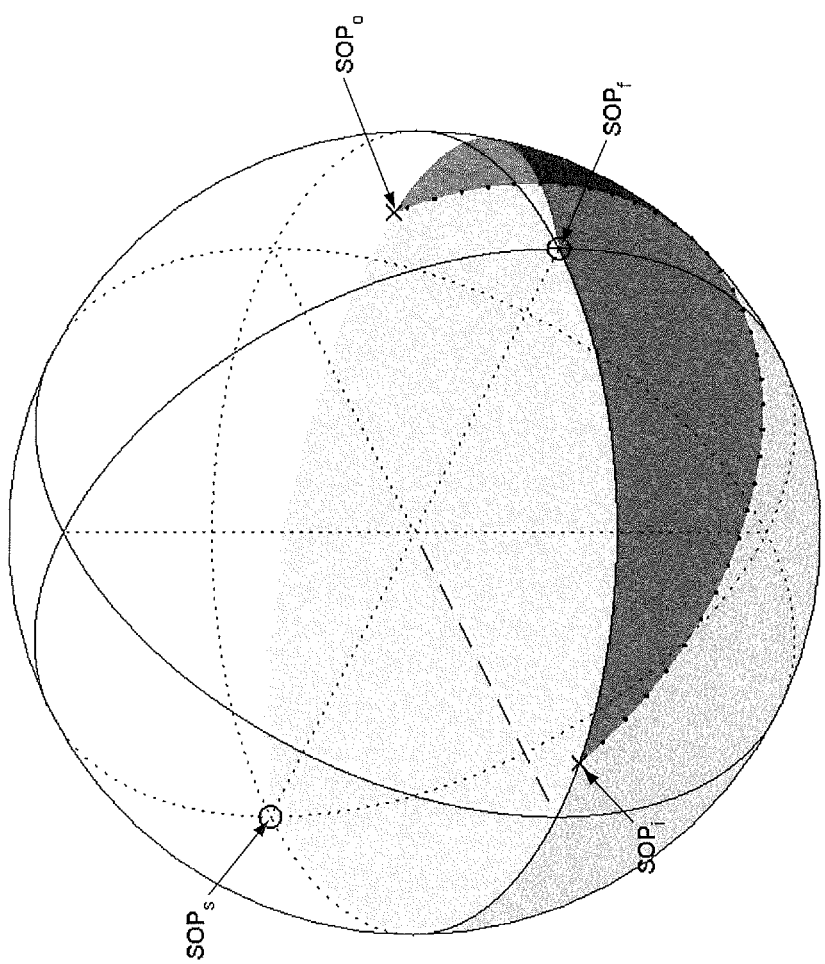
FIG. 24 illustrates traces and the corresponding solid angles on a Poincare sphere.
Figure 25:
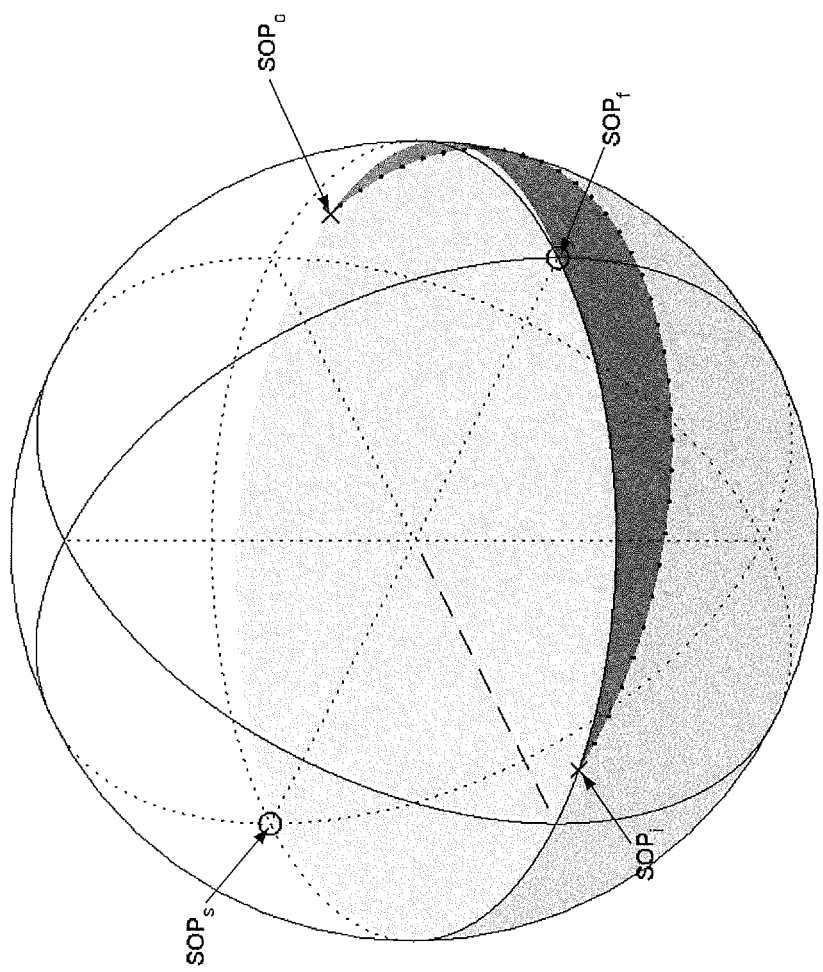
FIG. 25 illustrates further traces and the corresponding solid angles on a Poincare sphere.
Figure 26:
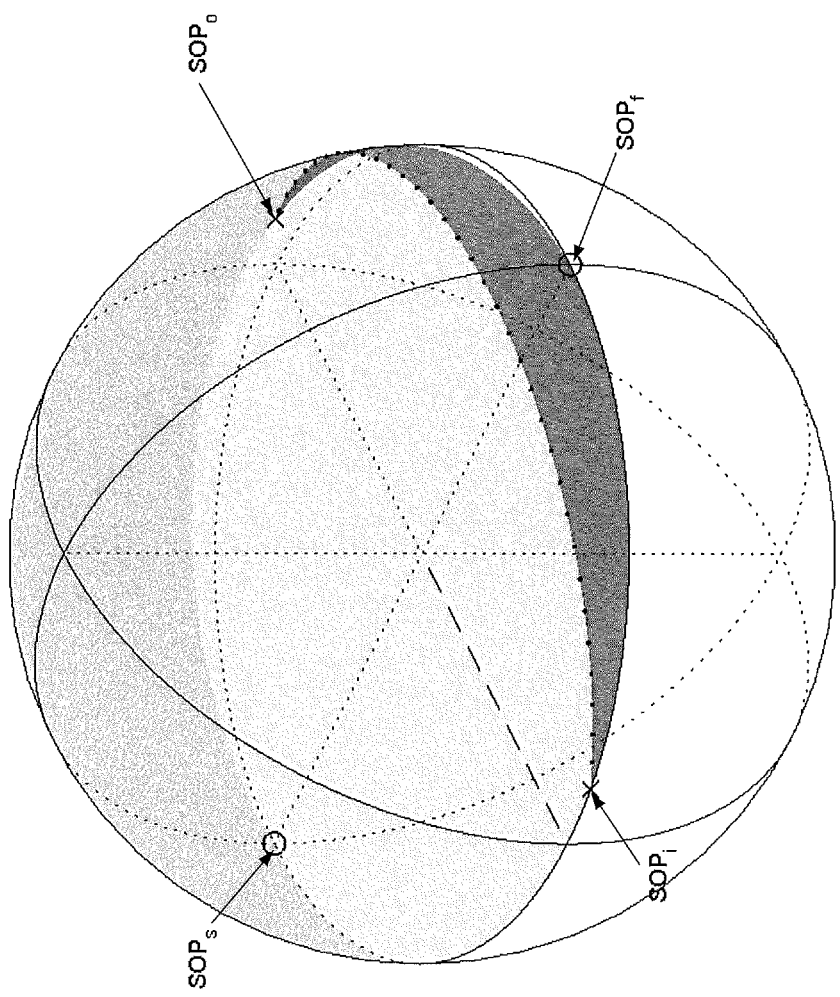
FIG. 26 illustrates further traces and corresponding solid angles on a Poincare sphere.
Figure 27:
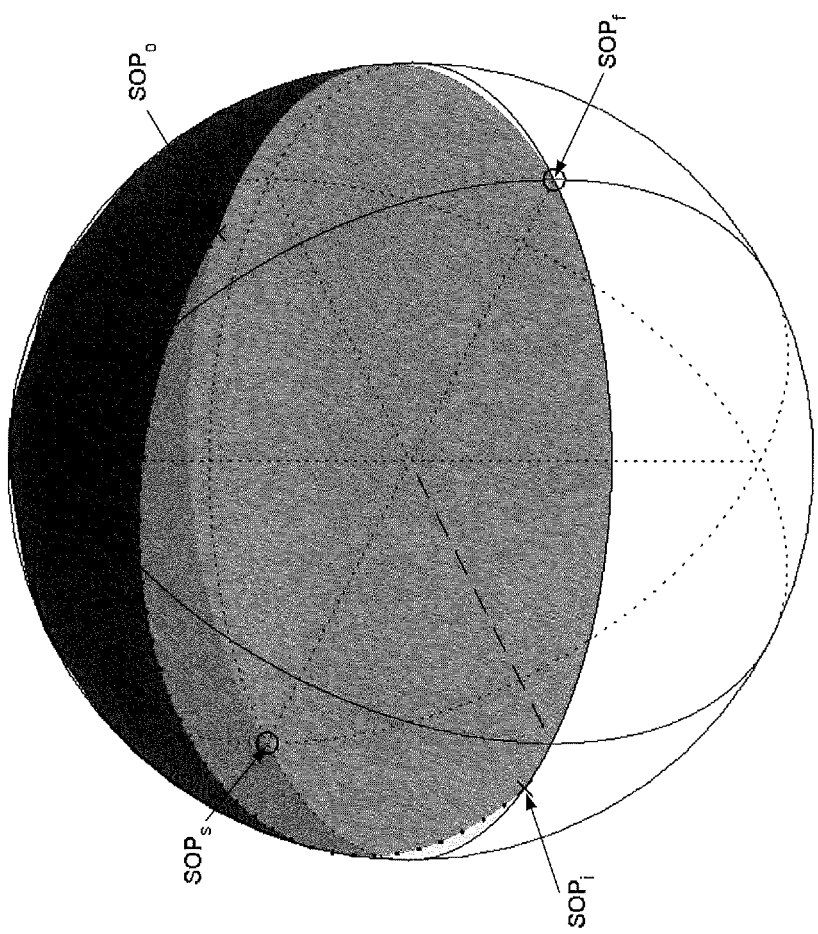
FIG. 27 illustrates further traces and the corresponding solid angles on a Poincare sphere.

FIG. 16 shows the calculated relation between the cosine β corresponding to the steep step and the ratio μf:μs of the loss factors. The circles represent the numerically calculated values. The solid line connects two neighboring values for a better overview. The cosine increases continuously with increasing ratio μf:μs of the loss factors.

It is noted that the diagrams shown in FIGS. 10 to 16 present simulation results. In real optical communication systems, the ratio of the first loss factor μf to the second loss factor μs is, for example, between 0.7:1 and 1:0.7, preferably between 0.8:1 and 1:0.8 and most preferably between 0.9:1 and 1:6.9. The steep step is then located at a position with the relative orientation (or the cosine β) being changed accordingly.

Using the embodiments of the phase modulation system, in particular incorporating the retardation device or half wave plate as well as the phase modulating method as described above, a relatively small variation in the polarization state can be converted into a relatively large shift in the phase of around π imposed on a carrier signal. Furthermore, such a phase modulation system and/or retardation device can be combined with either a transmitter or a receiver of an optical communication network as described.

Hence, the energy requirements for phase modulation may be reduced using the phase modulation system and/or the phase modulating method as described. Further, the error rate during the transmission of the carrier signal may be reduced.

Although preferred exemplary embodiments are shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention as defined in the claims.

LIST OF REFERENCE SIGNS

10 phase modulation device
12 retardation device
14 control device
16 light source 20 phase modulation device
22 photonic circuit
24 receiver
30 phase modulation device
31 photonic circuit
32 half wave plate
34 light source
36 polarization controller
36a, 36b polarization branch
38 switching unit
40 phase modulation device
42, 44 half wave plate
50 phase modulation device
52 half wave plate
60 retardation device
62, 64 wave plate
70 retardation device
72, 74 wave plate
80 receiver
82 half wave plate
84 transmission link
86 control device
90 receiver
92 polarization controller
94 half wave plate
β cosine of twice the azimuth angle difference
δ angle offset
Δθ azimuth angle difference
µf, µs loss factor
σ delay/retardation
Φ total phase shift
ΩXYZ, Ω0 solid angle
Li, Lo light
S1-S3 Stokes parameters
Sin, Sout, S'in, S'out polarization state
SOPi, SOPo polarization state
SOPf, SOPs polarization eigenstate, optic axis

The invention claimed is:
1. A phase modulation device configured to receive a light signal comprising input light, comprising:
 a retardation device characterized by a first polarization eigenstate $SOP_f$ and a second polarization eigenstate $SOP_s$,
 wherein light having a wavelength γ and polarized according to the second polarization eigenstate $SOP_s$ acquires, upon passing through the retardation device, a delay relative to light having the wavelength γ and polarized according to the first polarization eigenstate $SOP_f$, which delay corresponds to λ/2±30% wherein γ is the wavelength γ, and
 wherein the retardation device is arranged to:
  receive the input light, wherein the input light has a wavelength equal to γ and a polarization state $SOP_i$ that defines a first angle with respect to one of the first polarization eigenstate $SOP_f$ and the second polarization eigenstate $SOP_s$ within a predetermined angle range; and
  to emit output light; and
 a control device for controlling at least one of:
  a change of the first angle by less than 0.1*π,
  a change the delay by an amount corresponding to less than 0.3*λ,
 such that a phase shift of π±30% on the output light is obtained.
2. The phase modulation device of claim 1, wherein the control device is configured to receive a signal according to which at least one of the change of the first angle and the change of the amount of delay is controlled by the control device.
3. The phase modulation device of claim 1, wherein the retardation device includes a birefringent optical device.
4. The phase modulation device of claim 1, wherein the retardation device comprises a half wave plate.
5. The phase modulation device of claim 1, wherein the control device is configured to manipulate the polarization state $SOP_i$ of the input light.
6. The phase modulation device of claim 1, wherein the control device is configured to manipulate the first polarization eigenstate $SOP_f$ and the second polarization eigenstate $SOP_s$ of the retardation device.
7. The phase modulation device of claim 6, wherein the control device is configured to manipulate the first polarization eigenstate $DOP_f$ and the second polarization eigenstate $SOP_s$ by rotating the retardation device.
8. The phase modulation device of claim 1, wherein the control device is configured for changing the first angle according to one of the following:
 from an angle below π/4 to an angle above π/4;
 from an angle above π/4 to an angle below π/4.
9. The phase modulation device of claim 1, wherein the control device is configured to manipulate an optical path length covered by light while passing through the retardation device.
10. The phase modulation device of claim 1, wherein the obtained phase shift is caused by a geometrical phase shift effect.
11. The phase modulation device of claim 1, wherein the predetermined angle range is π/4±10%,
 wherein a second angle between $SOP_f$ and $SOP_i$ is defined as

$$\angle(SOP_f, SOP_i) = a\cos((SOP_f \cdot SOP_i)/((SOP_i \cdot SOP_i)*(SOP_f \cdot SOP_f))),$$

wherein $SOP_f$, $SOP_i$ are expressed by two dimensional complex Jones vectors, and
 wherein "·" represents the complex dot product.
12. A receiver for receiving a light signal comprising input light, which is modulated with respect to polarization, the receiver comprising:
 an optical input operable to receive the light signal; and
 a retardation device optically connected to the optical input, the retardation device characterized by a first polarization eigenstate $SOP_f$ and a second polarization eigenstate $SOP_s$,
 wherein light having a wavelength γ and polarized according to the second polarization eigenstate $SOP_s$ acquires, upon passing through the retardation device, a delay relative to light having the wavelength γ and polarized according to the first polarization eigenstate $SOP_f$, which delay corresponds to λ/2±30% wherein γ is the wavelength γ, and
 wherein the retardation device is arranged to:
  receive the input light, wherein the input light has a wavelength equal to γ and a polarization state $SOP_i$ that defines a first angle with respect to one of the first polarization eigenstate $SOP_f$ and the second polarization eigenstate $SOP_s$ in a predetermined angle range, and
  emit output light.
13. The receiver of claim 12, further comprising a control unit for adjusting the first polarization eigenstate $SOP_f$ and the second polarization eigenstate $SOP_s$ of the retardation device such that a change in the polarization state $SOP_i$ of the input light due to the polarization modulation leads to a phase shift of $\pi \pm 30\%$ of the output light of the retardation device.

14. The receiver of claim 13, wherein the control unit is configured for adjusting the first polarization eigenstate $SOP_f$ and the second polarization eigenstate $SOP_s$ by rotating the retardation device.

15. A transmitter comprising a phase modulation device according to claim 1.

16. A phase modulating method, comprising the steps of:
guiding polarized light through a phase modulation device according to claim 1;
controlling one of:
a change of the first angle by less than $0.3*\lambda$,
a change of the delay by an amount corresponding to less than $0.3*\gamma$,
such that a phase shift of $\pi \pm 30\%$ on the output light is obtained.

17. The method of claim 16, wherein the step of controlling the change of the first angle includes rotating the polarization state $SOP_i$ of the input light relative to the first polarization eigenstate $SOP_f$ and the second polarization eigenstate $SOP_s$ of the retardation device.

18. The method of claim 16, wherein the step of controlling the change of the first angle includes rotating the retardation device relative to the polarization state $SOP_i$ of the input light.

19. The method of claim 16, wherein the step of controlling the change of the amount of the delay includes manipulating a length covered by light while passing through the retardation device.

20. A method for phase modulation, comprising:
receiving input light having a wavelength $\gamma$ and a polarization state $SOP_i$ that defines a first angle, within a predetermined angle range, with respect to at least one of a first polarization eigenstate $SOP_f$ and a second polarization eigenstate $SOP_s$;
creating, with respect to light having the wavelength $\gamma$ and polarized according to the second polarization eigenstate $SOP_s$, a delay relative to light having the wavelength $\gamma$ and polarized according to the first polarization eigenstate $SOP_f$, which delay corresponds to $\lambda/2 \pm 30\%$ wherein $\gamma$ is the wavelength $\gamma$;
obtaining output light having a phase shift of $\pi \pm 30\%$ by controlling at least one of:
a change of the first angle by less than $0.1*\pi$,
a change of the delay by an amount corresponding to less than $0.3*\lambda$; and
emitting the output light.

* * * * *